US010855815B2

(12) United States Patent
Kounavis et al.

(10) Patent No.: US 10,855,815 B2
(45) Date of Patent: Dec. 1, 2020

(54) SECURITY-ORIENTED COMPRESSION

(71) Applicant: Intel Corporation, Santa Clara, CA (US)

(72) Inventors: Michael Kounavis, Portland, OR (US); David M. Durham, Beaverton, OR (US); Karanvir Grewal, Hillsboro, OR (US); Wenjie Xiong, Santa Clara, CA (US); Sergej Deutsch, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/674,346

(22) Filed: Nov. 5, 2019

(65) Prior Publication Data

US 2020/0076923 A1 Mar. 5, 2020

Related U.S. Application Data

(63) Continuation of application No. 15/839,194, filed on Dec. 12, 2017, now Pat. No. 10,498,865.

(51) Int. Cl.
*H03M 7/30* (2006.01)
*H04L 29/06* (2006.01)
*H04L 29/12* (2006.01)
*H04W 12/06* (2009.01)

(52) U.S. Cl.
CPC .............. *H04L 69/04* (2013.01); *H03M 7/30* (2013.01); *H04L 29/12839* (2013.01); *H04L 63/123* (2013.01); *H04L 63/20* (2013.01); *H04W 12/06* (2013.01)

(58) Field of Classification Search
CPC ... H04L 69/04; H04L 29/12839; H04L 63/20; H04L 63/123; H03M 7/30; H04W 12/06
See application file for complete search history.

(56) References Cited

U.S. PATENT DOCUMENTS

| 5,533,051 A | 7/1996 | James | |
|---|---|---|---|
| 8,497,788 B1* | 7/2013 | Miller | H03M 7/30 341/51 |
| 10,498,865 B2 | 12/2019 | Kounavis et al. | |
| 2006/0059187 A1 | 3/2006 | Brown | |
| 2008/0010309 A1* | 1/2008 | Sugita | H03M 7/30 |

(Continued)

OTHER PUBLICATIONS

"U.S. Appl. No. 15/839,194, Amendment and Response filed Jul. 2, 2019", 10 pgs.

(Continued)

*Primary Examiner* — Syed Haider
(74) *Attorney, Agent, or Firm* — Schwegman Lundberg & Woessner, P.A.

(57) ABSTRACT

A method of data nibble-histogram compression can include determining a first amount of space freed by compressing the input data using a first compression technique, determining a second amount of space freed by compressing the input data using a second, different compression technique, compressing the input data using the compression technique of the first and second compression techniques determined to free up more space to create compressed input data, and inserting into the compressed input data, security data including one of a message authentication control (MAC) and an inventory control tag (ICT).

20 Claims, 8 Drawing Sheets

(56) References Cited

U.S. PATENT DOCUMENTS

| | | | |
|---|---|---|---|
| 2011/0196849 A1* | 8/2011 | Hays | H03M 7/46 |
| | | | 707/693 |
| 2012/0256771 A1* | 10/2012 | Mitchem | G06F 9/445 |
| | | | 341/87 |
| 2014/0337442 A1* | 11/2014 | Zhuang | H04L 51/066 |
| | | | 709/206 |
| 2016/0099723 A1* | 4/2016 | Kletter | H03M 7/30 |
| | | | 341/51 |
| 2016/0344646 A1 | 11/2016 | Wang et al. | |
| 2017/0139062 A1 | 5/2017 | Davies | |
| 2018/0343127 A1 | 11/2018 | Campagna et al. | |
| 2019/0045030 A1 | 2/2019 | Kounavis et al. | |

OTHER PUBLICATIONS

"U.S. Appl. No. 15/839,194, Examiner Interview Summary dated Mar. 19, 2019", 3 pgs.
"U.S. Appl. No. 15/839,194, Non Final Office Action dated Dec. 31, 2018", 13 pgs.
"U.S. Appl. No. 15/839,194, Notice of Allowance dated Apr. 2, 2019", 10 pgs.
"U.S. Appl. No. 15/839,194, Notice of Allowance dated Jul. 18, 2019", 9 pgs.
"U.S. Appl. No. 15/839,194, Response filed Mar. 13, 2019 to Non Final Office Action dated Dec. 31, 2018", 11 pgs.
U.S. Appl. No. 15/839,194 U.S. Pat. No. 10,498,895, filed Dec. 12, 2017, Security-Oriented Compression.
U.S. Appl. No. 16/674,363, filed Nov. 5, 2019, Security-Oriented Compression.

* cited by examiner

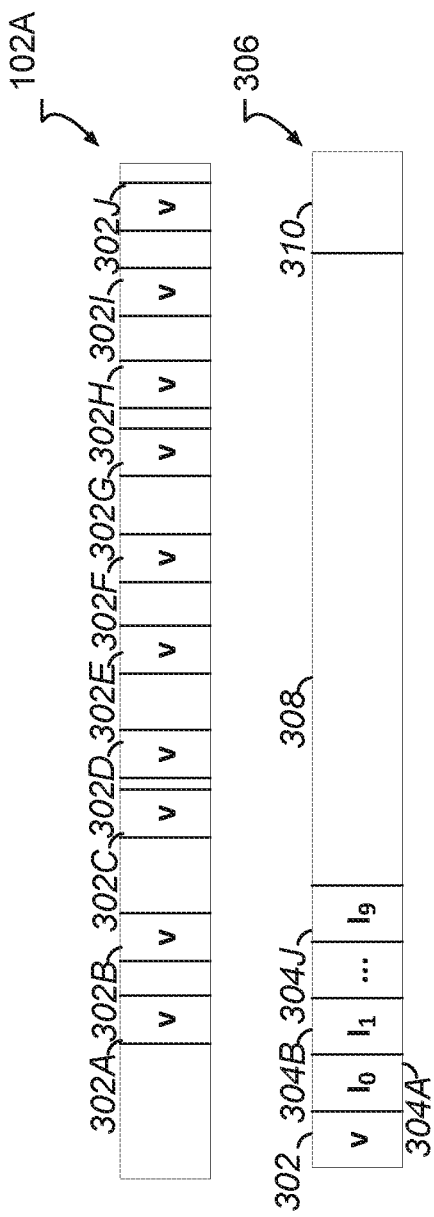
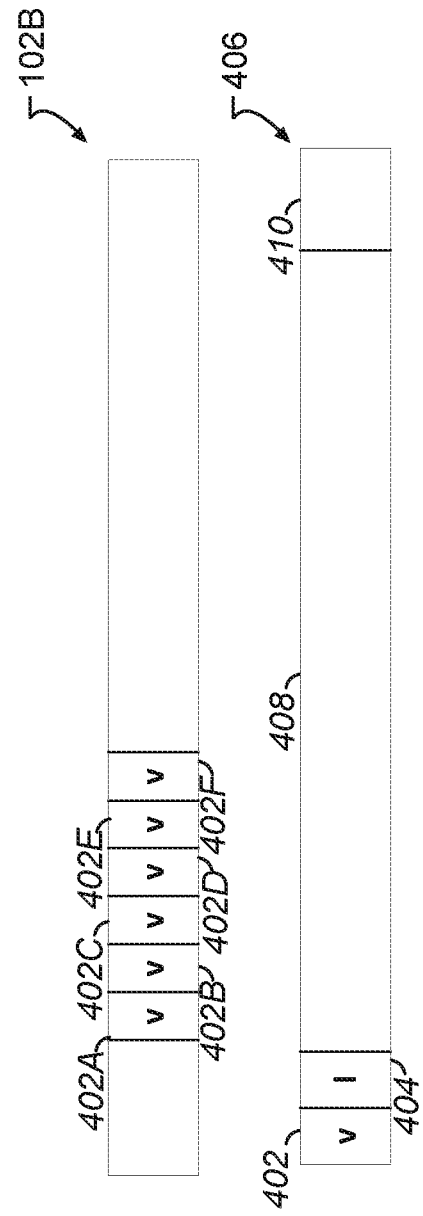
FIG. 3
FIG. 4

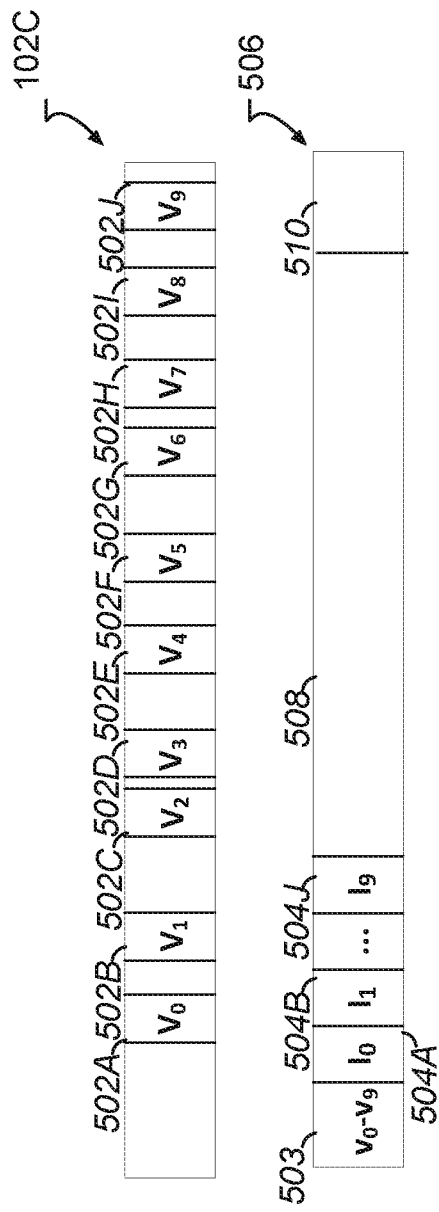
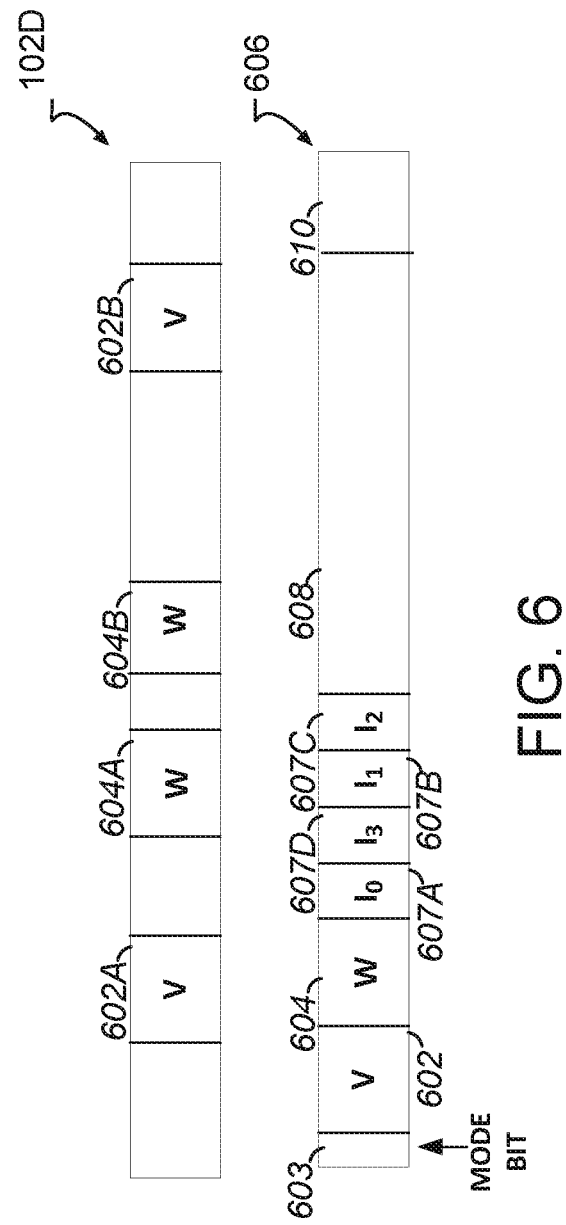
FIG. 5
FIG. 6

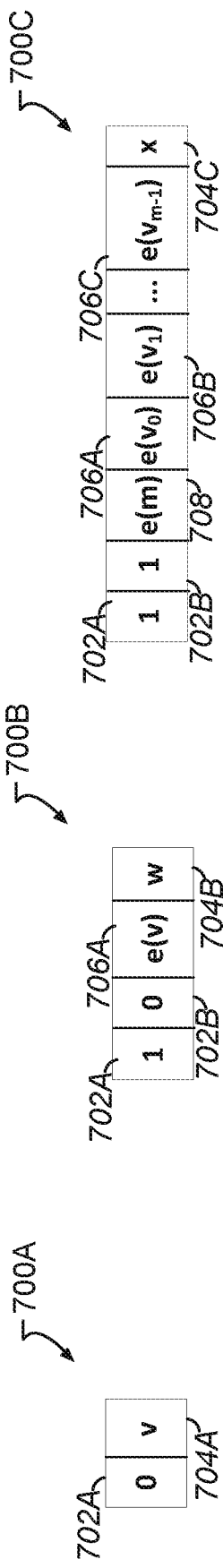
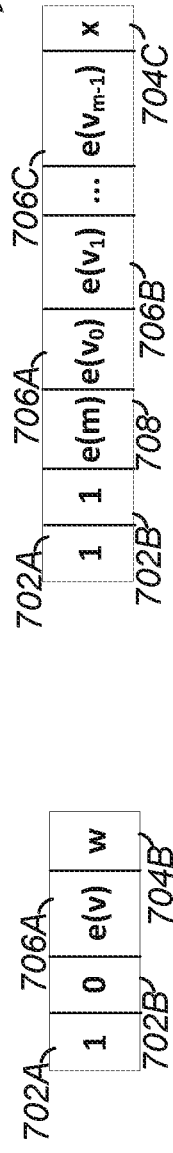
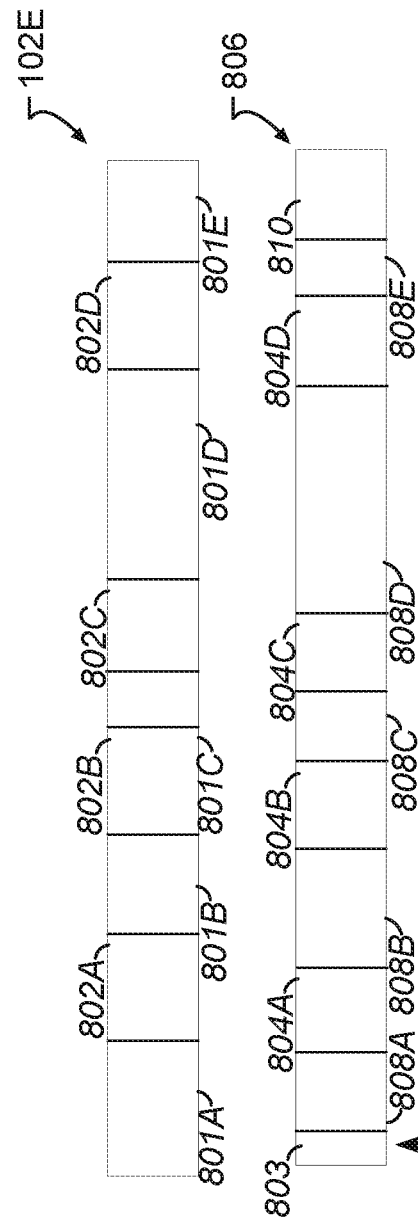

| PATTERN | PASS RATE | PASS + CACHE HIT | DECOMPRESSION (READ PATH) | | | COMPRESSION (WRITE PATH) | | |
|---|---|---|---|---|---|---|---|---|
| | | | DELAY (CYCLES) | AREA (MICRO-METERS²) | GATE EQUIV. (GE) | DELAY (CYCLES) | AREA (MICRO-METERS²) | GATE EQUIV. (GE) |
| 4 WORD EQUIV. | 78.16% | 94.76% | 2 | 1869 | 8.4k | 5 | 5894 | 26.3k |
| 10 BYTE EQUIV. | 73.37% | 93.61% | 3 | 4418 | 19.8k | 8 | 60901 | 272.5k |
| 6 BYTE ADJ. | 62.79% | 91.07% | 1 | 806 | 3.6k | 2 | 845 | 3.8k |
| 4 DWORD | 71.11% | 93.07% | 1 | 1239 | 5.5k | 4 | 3451 | 15.4k |
| WORD EQUIV. + BYTE ADJ. + DWORD | | | 2 | 3914 | 17.5k | 5 | 10189 | 45.6k |
| ALL | 82.92% | 95.90% | 3 | 8333 | 37.3k | 8 | 71089 | 318.2k |

FIG. 9

SECURITY-ORIENTED COMPRESSION

CROSS-REFERENCE TO RELATED APPLICATION

This application is a continuation of U.S. patent application Ser. No. 15/839,194 filed Dec. 12, 2017, which is incorporated by reference herein in its entirety.

TECHNICAL FIELD

Embodiments described herein pertain in general to compressing data. In some embodiments, the compression provides space to facilitate security data.

BACKGROUND

Compression techniques, either lossy or lossless, usually take advantage of the low entropy characteristics and patterns found in user data. This is done to reduce a size requirement for storing or transmitting the data. For example, lossless compression techniques such as the algorithms of the Lempel-Ziv family result in savings up to 90% or higher in text files or images with high degree or redundancy, such as may include repeating bit sequences.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 illustrates, by way of example, a diagram of an embodiment of compressing data based on bytes of the same value.

FIG. 4 illustrates, by way of example, a diagram of an embodiment of compressing data based on directly adjacent bytes of the same value.

FIG. 5 illustrates; by way of example, a diagram of an embodiment of compressing data based on bytes equal to a value of a variety of special values.

FIG. 6 illustrates, by way of example, a diagram of an embodiment of compressing data based on two pairs of double words being present in input data.

FIGS. 7A, 7B, and 7C illustrate, by way of example, data structure diagrams of respective nibble-histogram-based data encodings.

FIG. 8 illustrates, by way of example, a diagram of an embodiment of compressing data based on nibble-histogram-based compression of input data 102E.

FIG. 9 illustrates, by way of example, a table of results using security-oriented compression discussed herein.

DETAILED DESCRIPTION

Figure 1:
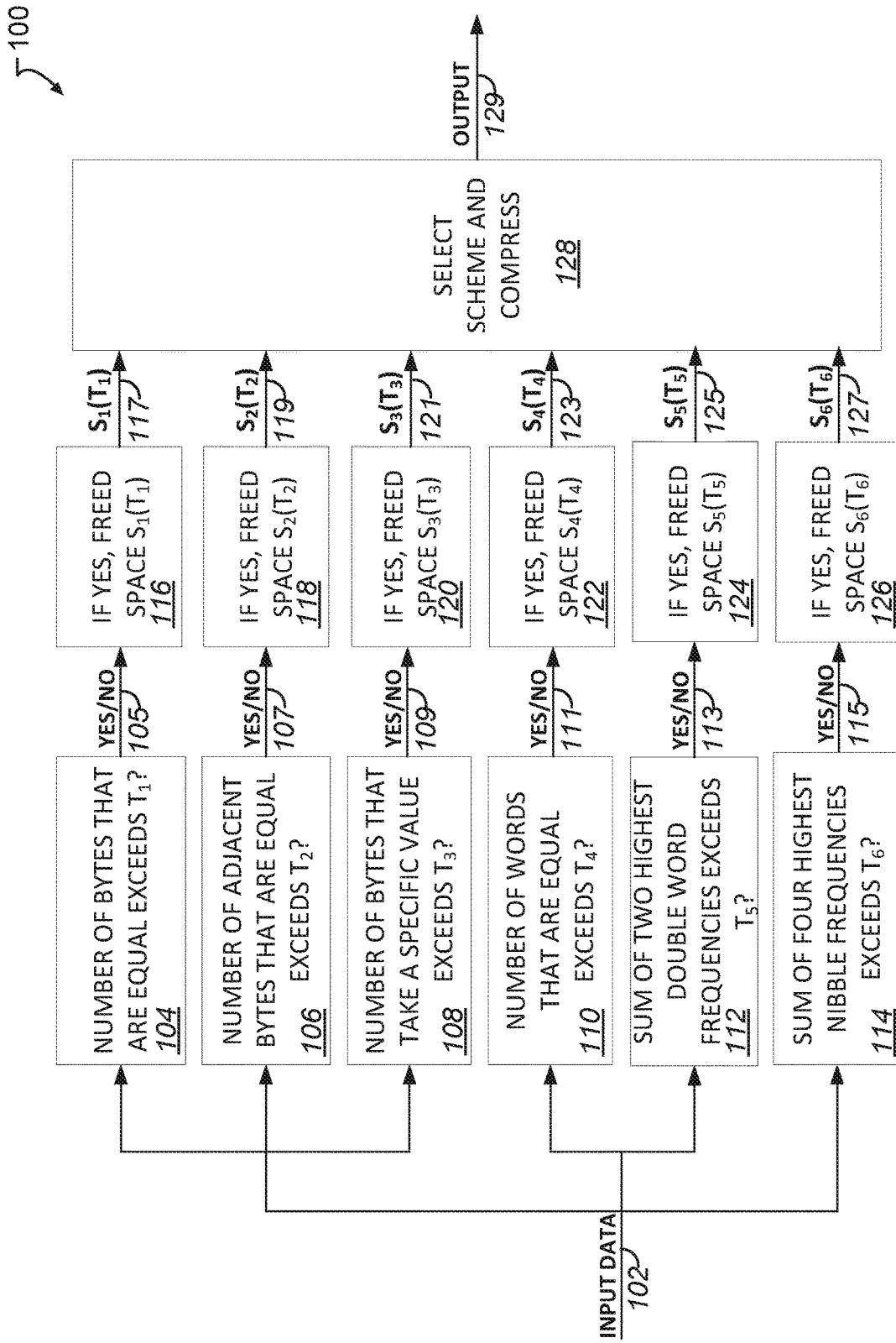
FIG. 1 illustrates, by way of example, a diagram of an embodiment of a method for security-oriented compression.

In the following description, for purposes of explanation, numerous specific details are set forth in order to provide a thorough understanding of some example embodiments. It will be evident, however, to one skilled in the art, that the present disclosure may be practiced without these specific details.

This disclosure regards a problem of security-oriented compression, which is different from a more general compression problem. As previously discussed, compression techniques, either lossy or lossless, usually take advantage of the low entropy characteristics and patterns found in user data. This is done to reduce a size requirement for storing or transmitting the data. For example, lossless compression techniques such as the algorithms of the Lempel-Ziv family result in savings up to 90% or higher in text files or images with high degree or redundancy, such as may include repeating bit sequences.

In contrast, in the security-oriented compression problem, the problem is successfully compressing data that are typically much smaller in size (e.g., 128-bits, 256-bits, or 512-bits of data, such as in a memory cache) than the typical inputs to standard techniques. Furthermore, compression is done for a different purpose. The intent is not to maximize the savings associated with compression, but to minimally free just enough space append security metadata to the data without message expansion.

Security metadata may include control tags, Message Authentication Codes (MACs), Integrity Check Values (ICVs), or the like. Avoiding message expansion for storing security metadata is important because of overhead and cost issues. For example, accessing metadata for protecting memory cache lines may result in doubling the memory access bandwidth requirement, in some cases.

Addressing the security-oriented compression problem requires a different approach as compared to addressing the standard compression problem. First, the sizes of messages to compress are not only small, but are smaller than the sizes of the data structures used by standard compression algorithms. For example, the Lempel-Ziv family of compression techniques use sliding windows to detect repeating patterns, the size of which is typically a few KB, Security-oriented compression algorithms, on the other hand, are called to compress entities which may be as small as 64 bytes (e.g., cache lines).

Second, the types of patterns which are searched for differ between standard compression and security-oriented compression algorithms. Security-oriented compression algorithms operate on small inputs. For this reason, they may search for a wider set of patterns than standard algorithms. A variety of patterns are described herein, which are defined on entities of varying sizes ranging from nibbles (e.g., four bits or half a byte) to double-words (e.g., 32-bits or four bytes).

Third, standard algorithms create and use dictionaries of repeated patterns which may be quite elaborate. In contrast, security-oriented compression techniques either eliminate the need for dictionaries or use dictionaries that occupy minimal space typically consisting of no more than three bit spaces.

Compression techniques that seek to maximally reduce an amount of space that data consumes are not suitable for security-oriented compression for at least the reasons previously discussed. Also, metadata used for security may be stored separately from user data without any compression. For example, a solution has been proposed in which space reserved for error correcting code (ECC) bits is used for storing integrity check values (ICVs). The use of compression has the advantage of potentially saving significant space for storing metadata and significant bandwidth for transmitting and receiving metadata. Another technique for security-oriented compression achieves successful compression results based on the appearance of repeated bytes and repeated 16-bit words found in user data. Embodiments herein provide a more universally applicable approach to security-oriented compression that encompasses more types of patterns, which are observed on a much wider range of data units, ranging from nibbles to double words.

A methodology, alternative to compression, which supports message integrity without message expansion is implicit: integrity. Implicit integrity is based on the idea that user data demonstrate patterns, such as repeated nibbles, bytes, or words. If some cipher text is corrupted, then the resulting plaintext does not demonstrate patterns any more with very high probability. Thus, content corruption may be detected. Implicit integrity is more cost effective than compression as it does not require extra logic or software for computing MACs and avoids performing compression and decompression tasks once patterns are detected. A disadvantage of implicit integrity is that, at the time of writing, it is a non-standard cryptographic technique. Even though proofs purport to establish the security of implicit integrity systems, it typically takes years for a new cryptographic technique, such as implicit integrity, to be adopted by the scientific community and industry ecosystem. On the other hand, compression does not perform any nonstandard crypto functionality but merely saves space in user data to hold security metadata.

As previously discussed, prior compression techniques are not easily applicable to security-oriented compression, because they are designed to compress much larger entities or use elaborate dictionaries. Further, storing metadata without compression is associated with storage and transmission bandwidth cost issues. Further yet, past techniques are not as widely applicable as techniques discussed herein and do not demonstrate the full potential of security-oriented compression. Moreover, a promising alternative methodology of implicit integrity has not yet been adopted in any crypto standard and requires its own time for industry wide acceptance.

Figure 2:
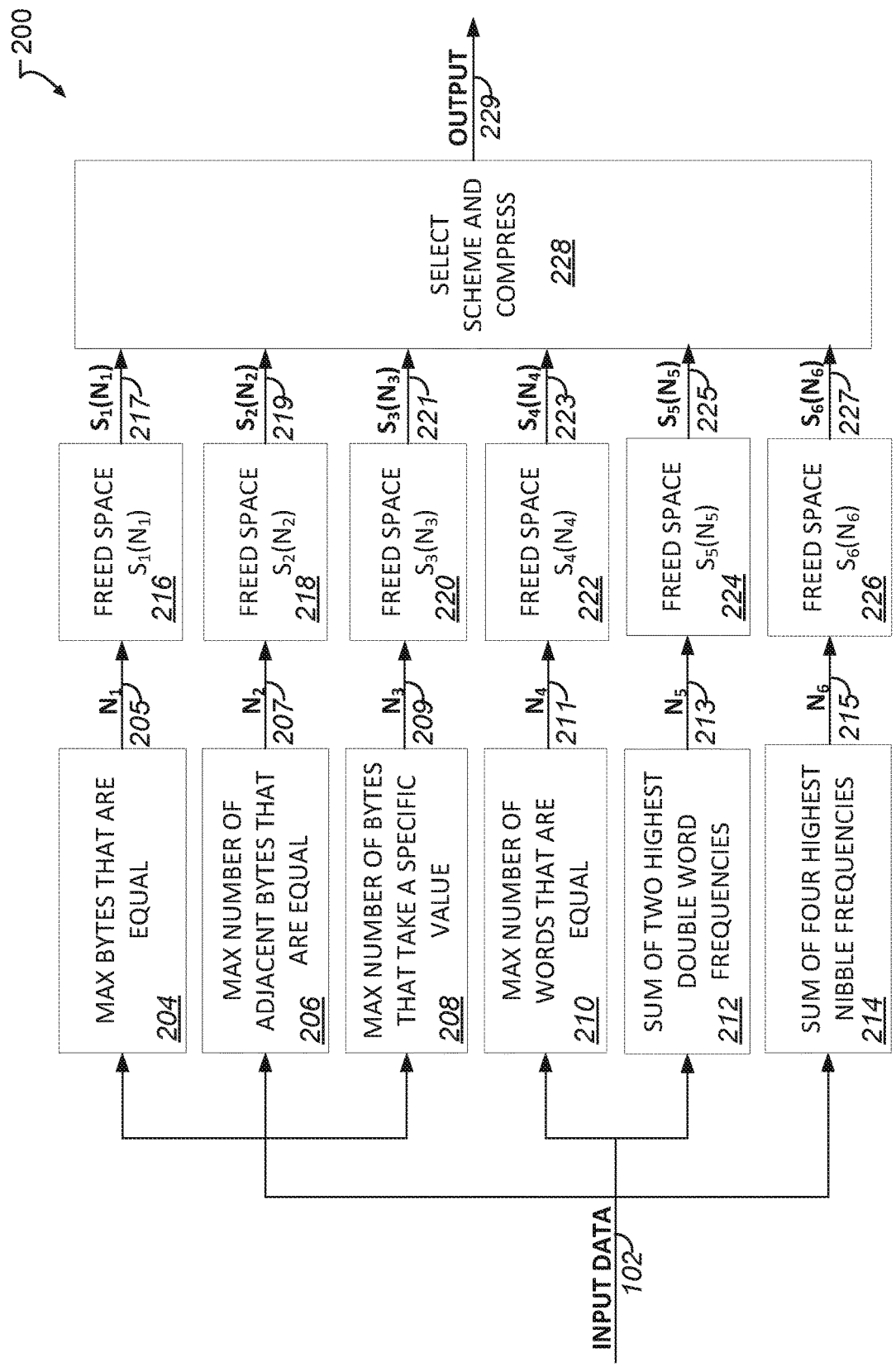
FIG. 2 illustrates, by way of example, a diagram of an embodiment of another method for security-oriented compression.

In the methods 100 and 200 illustrated in FIGS. 1 and 2, space is freed up, such as to append security metadata, such as a message authentication code (MAC) or integrity check values (ICV), by identifying patterns. In embodiments, replicated data may be encoded using a single instance of the values, an encoding of the index positions where the values are located and additional mode bits, as explained elsewhere herein. Depending on the encoding scheme employed, the savings from pattern matching may free up enough space to meet goals of security-oriented compression.

One or more embodiments do not use large dictionaries to support lossless decompression, but only a small number of compression metadata values. Compression metadata values may include the unique instances of replicated values, the encodings of indexes where the replicated values are located, or optional mode bits.

FIG. 1 illustrates, by way of example, a diagram of an embodiment of a method 100 for security-oriented compression. A variety of patterns are considered by the method 100. Patterns include subsets of data, such as bytes, words, nibbles, or double words being equal to each other. Patterns include the subsets of the data being equal to each other, adjacent data being equal to each other, data being equal to special values, such as a minimum value (e.g., 0x00) or maximum value (e.g., 0xFF), or value histograms demonstrating sums of n highest data being higher than a threshold.

The method 100 may include determining whether a number of bytes of input data 102 are equal to each other exceed a threshold $T_1$, at operation 104. The method 100 may include determining whether a number of adjacent bytes of the input data 102 are equal to each other exceed a threshold $T_2$, at operation 106. The method 100 may include determining whether a number of bytes of the input data 102 of a specific value exceed a threshold $T_3$, at operation 108. The method 100 may include determining whether a number of words of the input data 102 that are equal to each other exceed a threshold $T_4$, at operation 110. The method 100 may include determining whether a sum the two highest double frequencies of the input data 102 exceeds a threshold $T_5$, at operation 112. The method 100 may include determining whether a sum of the four highest nibble frequencies of the input data 102 exceeds a threshold $T_6$, at operation 114. The operations 104, 106, and 108 operate on bytes (eight consecutive bits). The operations 110 and 112 operate on words (sixteen consecutive bits) or double words (thirty-two consecutive bits). The operation 114 operate on nibbles (four consecutive bits). Data blocks (e.g., double-word, word, byte, nibble, etc.) are aligned to the input data 102.

In response to determining, at operation 104, that the number of bytes that are equal to each other exceed $T_1$ (as indicated on line 105), an amount of space freed by compressing the bytes that are equal to each other may be determined, at operation 116. In response to determining, at operation 106, that the number of adjacent bytes that are equal to each other exceed $T_2$ (as indicated on line 107), an amount of space freed by compressing the adjacent bytes that are equal to each other may be determined, at operation 118. In response to determining, at operation 108, that the number of bytes that are equal to a specific value exceed $T_3$ (as indicated on line 109), an amount of space freed by compressing the bytes that are equal to the specific value (e.g., 0x00, 0xFF, or the like) may be determined, at operation 120.

In response to determining, at operation 110, that a number of words (or double words) that are equal to each other exceed $T_4$ (as indicated on line 111), an amount of space freed by compressing the words that are equal to each other may be determined, at operation 122. In response to determining, at operation 112, that the sum of the two highest double word frequencies exceeds $T_5$ (as indicated on line 113), an amount of space freed by compressing the double words corresponding to the two highest double word frequencies may be determined, at operation 124. In response to determining, at operation 114, that the sum of the four highest nibble frequencies exceeds $T_6$ (as indicated on line 115), an amount of space freed by compressing the nibbles corresponding to the four highest nibble frequencies may be determined, at operation 126.

Each of the amounts determined at operations 116, 118, 120, 122, 124, or 126 may be provided to determine how to compress the input data 102, at operation 128. The freed space may be provided on lines 117, 119, 121, 123, 125, and 127. The resulting output 129 may be provided in response to operation 128.

FIG. 2 illustrates, by way of example, a diagram of an embodiment of another method 200 for security-oriented compression. A variety of patterns, similar to or the same as the patterns of the method 100, are considered by the method 200. The method 200 is similar to the method 100 with the method 200 being more general, to free up a variable amount of space. In general, the method 100 determines ways to compress the input data 102 to free up a threshold amount of space, while the method 200 determines which compression scheme, of a variety of compression schemes will maximally compress the input data 102.

The method 200 may include determining a maximum number of bytes, $N_1$, of the input data 102 that are equal to each other, at operation 204. The method 200 may include determining a maximum number of adjacent bytes, $N_2$, of the input data 102 that are equal to each other, at operation 206. The method 200 may include determining a maximum number of bytes, $N_3$, of the input data 102 equal to a specific value, at operation 208. The method 200 may include determining a maximum number of words, $N_4$, of the input data 102 that are equal to each other, at operation 210. The method 200 may include determining a maximum sum the two highest double-word frequencies, $N_5$, of the input data 102, at operation 112. The method 200 may include determining a maximum sum of the four highest nibble frequencies, $N_6$, of the input data 102, at operation 214. The operations 204, 206, and 208 operate on bytes (eight consecutive bits). The operations 210 and 212 operate on words (sixteen consecutive bits) or double words (thirty-two consecutive bits). The operation 214 operate on nibbles (four consecutive bits).

In response to determining, at operation 204, $N_1$ (as indicated on line 205), an amount of space freed by compressing the bytes that are equal to each other may be determined, at operation 216. In response to determining, at operation 206, $N_2$ (as indicated on line 207), an amount of space freed by compressing the adjacent bytes that are equal to each other may be determined, at operation 218. In response to determining, at operation 208, $N_3$ (as indicated on line 209), an amount of space freed by compressing the bytes that are equal to the specific value (e.g., 0x00, 0xFF, or the like) may be determined, at operation 220.

In response to determining, at operation 210, $N_4$ (as indicated on line 211), an amount of space freed by compressing the words that are equal to each other may be determined, at operation 222. In response to determining, at operation 212, $N_5$ (as indicated on line 213), an amount of space freed by compressing the double words corresponding to the two highest double word frequencies may be determined, at operation 224. In response to determining, at operation 214, $N_6$ (as indicated on line 215), an amount of space freed by compressing the nibbles corresponding to the four highest nibble frequencies may be determined, at operation 226.

Each of the amounts determined at operations 216, 218, 220, 222, 224, or 226 may be provided to determine how to compress the input data 102, at operation 228. The freed space may be provided on lines 217, 219, 221, 223, 225, and 227. The resulting output 229 may be provided in response to operation 228.

The methods 100 and 200 may compress smaller amounts of data, such as cache lines and storage blocks. The freed space may be enough for appending security metadata such as 32-bit or 64-bit truncated MAC, access control information, or security policy metadata. Many of the embodiments are also efficient to implement in hardware. One or more embodiments may require no more than 1-3 clock cycles for decompression and 2-8 clock cycles for compression. The methods 100 and 200 further support pipelined implementations of single clock throughput and incur a reasonably small area cost in hardware. The compression techniques of the methods 100 and 200 are associated with high pass rates among representative client and server workloads. A "pass rate" is ratios of the number of data units that compress the data to allow addition of security metadata using the techniques to the total number of data units. Pass rates were measure for over 110 million representative client workload cache lines and 1.47 billion representative server workload cache lines. The pass rates determined were as high as about 83%.

One or more of the operations 104, 116, and 128 or 204, 216, and 228 may be called "byte-equality compression". One or more of the operations 106, 118, and 128 or 206, 218, and 228 may be called "adjacent byte-equality compression". One or more of the operations 108, 120, and 128 or 208, 220, and 228 may be called "special-value compression". One or more of the operations 110, 122, and 128 or 210, 222, and 228 may be called "word-equality compression". One or more of the operations 112, 124, and 128 or 212, 224, and 228 may be called "double-word histogram compression". One or more of the operations 114, 126, and 128 or 212, 224, and 228 may be called "nibble histogram compression".

Embodiments may be part of systems supporting memory encryption with integrity without incurring the cost of message expansion. Embodiments may be used for saving space in various contexts, including saving space in double data rate (DDR) memory chips, saving space in non-volatile (3D cross point) memory systems, or the like. Memory integrity at low cost may be important to the execution of isolated virtual machines on top of an entrusted hypervisor, to the detection of malicious alteration of content in storage systems and to the detection of corruption in data networking and communications. One or more embodiments may be suitable for hardware compression.

As previously discussed, FIGS. 1 and 2 show methods 100 and 200 associated with freeing up constant and maximal space, respectively. Both variants employ one or more pattern checks. These pattern checks help provide a scheme for security-oriented compression.

One type of pattern check detects entities (sequences of consecutive bits) among the input data 102 (e.g., a cache line) that are equal to each other, such as at operations 104, 110, 204, and 210. Entities may be nibbles, bytes, words (16-bit), or double-words (32-bit). Another type of pattern check concerns entities among the input data which are not only equal to each other, but are also placed in continuous index positions, such as at operation 106 and 206. This second type of pattern checks is not necessarily the same as the first one. For example, one may associate these two pattern checks with different thresholds, $T_1$ and $T_2$, respectively. In such embodiments, two different pattern detectors may be employed.

Yet another type of pattern check detects entities that equal special values, such as at operation 108 and 208. Special values are values that are frequently encountered in regular user data. For example, in many different types of user data, a high percentage of bytes take the values of 0x00 or 0xFF. A last type of pattern check detects entities the value histogram of which demonstrates a sum of n highest entries (i.e., frequencies) being higher than a threshold or a maximum value. The intuition behind this type of pattern check is that there are several types of input messages, the content of which is not as random as that of encrypted data, but also does not demonstrate patterns at the byte or word granularity. One example of such content is media data, where nibble values may be replicated, but data do not demonstrate significant byte or word replications. A pattern check that computes whether the sum of the n highest nibble frequencies exceeds a threshold may be efficient for this type of data. For security-oriented compression a pattern detector may use n=4. By checking whether the sum of the four highest nibble frequencies exceeds a threshold, a more flexible pattern detector may be built, which may result in sufficient freed space for some class of data. A nibble pattern detector, which may be better suited for a software implementation, is discussed elsewhere.

As previously discussed, what differentiates the method 100 from the method 200 is the method 100 frees a constant amount of space, whereas the method 200 frees the maximal possible space for the pattern detector technique. The method 100 employs detectors which check whether patterns in the input data 102 exceed a threshold, Each pattern detector may use a different or same constant threshold (e.g., $T_1$, $T_2$, $T_3$, $T_4$, $T_5$, or $T_6$). The method 200, on the other hand, employs detectors which return the highest number of entities that exhibit a pattern for each of one or more different patterns. Based on these numbers, a maximal freed space value may be computed and used as the basis for compressing the input data 102 to create the output 129.

The detectors of the method 100 employ six constant threshold values $T_1$-$T_6$, which are further used for computing six freed space values $S_1$-$S_6$. These values are either constant if the threshold number of patterns exist in the input data 102 or zero if patterns do not exist. After freed space values are computed or otherwise identified, a compression scheme may be selected, at operation 128.

In the methods 100 and 200, each of the operations 104, 106, 108, 110, 112, 114, 204, 206, 208, 210, 212, and 214 may correspond to different pattern detectors. For example, compression is done differently when based on byte equality patterns (e.g., operations 104, 106, 108, 204, 206, and 208), as compared to other cases when based on word or double word equality patterns (e.g., operations 110 or 210). The compression scheme selected corresponds to a pattern detector that returns a positive freed space value in one or more embodiments, the method 100 or 200 may select the scheme with the largest positive freed space from among $S_1$-$S_6$. In one or more embodiments, the method 100 or 200 selects a scheme based on its cost or its performance. For example, the method 100 or 200 may prioritize word-based schemes over byte-based schemes or nibble-based schemes.

The method 200, in contrast with the method 100, does not employ any threshold values. The detectors of the method 200 return the highest numbers of entities $N_1$-$N_6$ that exhibit the detected pattern. For these values, maximal freed space values $S_1$-$S_6$ are computed. Subsequently, the method 200 selects a compression scheme, at operation 228, in a same or similar manner, as the method 100. Each of the security-oriented compression schemes are further described regarding the remaining FIGS.

Pseudocode representing compression based on byte equality is provided in the function "COMPRESS_BYTE_EQUALITY". The pseudocode represents operations that may be performed by a detector that implements the operation 104 or 204. In the pseudocode, the function "COMPRESS_BYTE_EQUALITY", accepts a byte sequence h (e.g., all or a portion of the input data 102). The routine compresses the sequence based on the presence of in bytes that are equal to each other. In the compressed output, the in bytes are replaced by a single instance of their common value v and by an encoding of the indexes $\{i_0, i_1, \ldots i_{m-1}\}$ where the bytes are in the input data 102. An encoding of the indexes may be used, because not all indexes require their full bit length to be represented.

```
COMPRESS_BYTE_EQUALITY (b, D)
b = b₀|b₁|... |b_{n-1} ← input sequence of n bytes
D ← mode of operation that takes values from the set
{FREE_CONSTANT, FREE_MAXIMAL}
if (D = FREE_CONSTANT)
    m ← number of bytes to search for; set to a constant value
else // D = FREE_MAXIMAL
    m ← highest number of bytes in b that are equal to each other
{i₀, i₁, ..., i_{m-1}} ← indexes of positions of bytes that are equal to each
    other
b̄ ← {b_{i0}, b_{i1}, ..., b_{im-1}} ← bytes at indexes {i₀, i₁, ..., i_{m-1}}; they are
    equal to each other
if (b̄ exists)
    v ← b_{i0} // v is the common value of b_{i0}, b_{i1}, ..., b_{im-1}
    {I₀, I₁, ..., I_{m-1}} ← ENCODE_N_CHOOSE_M (i₀, i₁, ..., i_{m-1}) // this is
        an encoding of
    //the indexes i₀, i₁, ..., i_{m-1}
    b̄ ← {b̄_{i0}, b̄_{i1}, ..., b̄_{in-m-1}} ← b − b̄ //this is the set of the remaining
        elements of b
    //if m bytes of b̄ that are equal to each other are removed
    if (D = FREE_CONSTANT)
        c ← v | I₀ | I₁ | ... | I_{m-1} | b̄_{i0}| b̄_{i1}|... | b̄_{in-m-1} // c is the encoding of the
            input byte
        // sequence b that considers the equality of the bytes of the subset b̄
    else
        c ← v |m| I₀ | I₁ | ... | I_{m-1} | b̄_{i0}
         | b̄_{i1}|... | b̄_{in-m-1}
    if (LENGTH(c) < LENGTH(b)) //savings are achieved
        return c
    else
        return ∅
else
    return ∅
```

FIG. 3 illustrates, by way of example, a diagram of an embodiment of compressing data 300 based on bytes of the same value. The embodiment of FIG. 3 corresponds to operations 104 204, 128, and 228 of the methods 100 and 200. In the embodiment of FIG. 3, the input data 102 includes ten bytes 302A, 302B, 302C, 302D, 302E, 302F, 302G, 302H, 302I, and 302J that are each of equal value. Compressed data 306 includes the value 302, v, of each of the bytes 302A-302J, the indexes 304A, 304B, . . . , 304J of each of the bytes 302A-302J, respectively, remainder data 308 of the data 102 that does not include the ten bytes of equal value, and data spaces 310 corresponding to space saved from the compression. The total space occupied by the ten bytes 302A-302.1 pre-compression is 80 bits. The indexes 304A-304J may consume 40 bits (e.g., six bits to represent the byte-location of the byte 302A, five bits to represent the byte-distance to the byte 302B from the byte 302A, four bits to represent the byte-distance to the byte 302C from the byte 302B, four bits to represent the byte-distance to the byte 302D from the byte 302C, four bits to represent the byte-distance to the byte 302E from the byte 302D, four bits to represent the byte-distance to the byte 302F from the byte 302E, three bits to represent the byte-distance to the byte 302G from the byte 302F, three bits to represent the byte-distance to the byte 302H from the byte 302G, three bits to represent the byte-distance to the byte 302I from the byte 302H, and three bits to represent the byte-distance to the byte 302J from the byte 302I). The space saved, in this embodiment may be 32 bits (80 bits 48 bits). Note that the indexes of the embodiment described do not encompass all possible locations of ten bytes in the input data 102, but according to some experimental results, covers over 70% of billions of possible 512-bit input sequences.

Note that the description of FIG. 3 assumes that the input data 102 is 512 bits (64 bytes). A byte location indicates which of the 64 possible byte locations at which the byte is located. Thus, six bits may be used to represent the first location. Other index encodings may be used to help compress a larger number of 512-bit input data at the expense of freeing up less space. Conversely, some other index encodings may be used to help free up more space at the expense of not being applicable to as many 512-bit input data sequences. For example, consider an embodiment in which the input data 102 includes the first byte 302A situated at byte-location 2 of 64 and the second byte 302B situated at byte-location 36. The index encoding scheme discussed in the previous paragraph would not be sufficient to encode this data sequence. However, an index encoding sequence that includes 6 bits to identify the location of the second byte 302B would be able to compress such an input data sequence.

Also note that the embodiment of FIG. 3 assumes that the number of bytes that are of equal value is known a priori. This is not the case in the method 200, but is the case in the method 100. Thus, in some embodiments, up to six bits may be used to represent the number of bytes that are of equal value.

Pseudocode describing compression based on adjacent byte equality is given below in the function "COMPRESS_ADJACENT_BYTE_EQUALITY". The function "COMPRESS_ADJACENT_BYTE_EQUALITY" accepts as input a byte sequence h, as the input data 102. The function compresses the input data 102 based on the presence of in bytes that are directly adjacent and equal to each other. In the compressed output, the in bytes are replaced by a single instance of their common value v and by the index of the first byte in the sequence. No encoding of other byte indexes is required in this case.

---

COMPRESS_ADJACENT_BYTE_EQUALITY (b, D)
b = $b_0|b_1|... |b_{n-1}$ ← input sequence of n bytes
D ← mode of operation that takes values from the set
{FREE_CONSTANT, FREE_MAXIMAL}
if (D = FREE_CONSTANT)
m ← number of adjacent bytes to search for; set to a constant value
else // D = FREE_MAXIMAL
m ← highest number of adjacent bytes in b that are equal to each other
i0 ← index of the first position in the sequence adjacent equal bytes
$\bar{b}$← {$b_{i0}$, $b_{i0+1}$, ..., $b_{i0+m-1}$} ← bytes at indexes {$i_0$, $i_{0+1}$, ..., $i_{0+m-1}$} that are equal
if ($\bar{b}$ exists)
v ← $b_{i0}$ // v is the common value of $b_{i0}$, $b_{i0+1}$, ..., $b_{i0+m-1}$
$\bar{b}$← {$\bar{b}_{i0}$, $\bar{b}_{i1}$, ..., $\bar{b}_{in-m-1}$} ← b − $\bar{b}$//this is the set of the remaining elements of b
//if m bytes of $\bar{b}$ that are adjacent and equal to each other are removed
if (D = FREE_CONSTANT)
c ← v | $i_0$| $\bar{b}_{i0}$| $\bar{b}_{i1}$| ... | $\bar{b}_{in-m-1}$ // c is the encoding of the input byte
// sequence b that takes into account the equality of the bytes of the subset $\bar{b}$
else
c ← v |m| $i_0$ | $\bar{b}_{i0}$| $\bar{b}_{i1}$|...| $\bar{b}_{in-m-1}$
if (LENGTH(c) < LENGTH(b)) // savings are realized
return c
else
return Ø
else
return Ø

---

FIG. 4 illustrates, by way of example, a diagram of an embodiment of compressing data 400 based on directly adjacent bytes of the same value. The embodiment of FIG. 4 corresponds to operations 106, 206, 128, and 228 of the methods 100 and 200. In the embodiment of FIG. 4, the input data 102B includes six bytes 402A, 402B, 402C, 402D, 402E, and 402F that are each of equal value. Compressed data 406 includes a value 402, v, of each of the bytes 402A-402F, the index 404 of the first byte 402A, remainder data 408 of the data 102B that does not include the directly adjacent six bytes of equal value, and data spaces 410 corresponding to space saved from the compression.

The total space occupied by the six bytes 402A-402F pre-compression is 48 bits. The index 404 may consume 6 bits (e.g., six bits to represent the byte-location of the byte 402A. The data spaces 410, in this embodiment may be 34 bits (48 bits−14 bits (8 bits for byte value, v, and six bits for index 304). The data spaces 410 may be for an access control tag, a truncated MAC, or the like. No encodings of other byte indexes are required by this compression.

Note that the embodiment of FIG. 4 assumes that the number of bytes that are directly adjacent and of equal value is known a priori. This is not the case in the method 200, but is the case in the method 100. Thus, in some embodiments, up to six bits may be used to represent the number of bytes that are directly adjacent) and of equal value.

As previously discussed compression may also be done by taking into account that some bytes take special values such as 0x00 or 0xFF. A pseudocode version of a function called "COMPRESS_BYTES_TAKING_SPECIAL_VALUES" below accepts as input a byte sequence, h, as the input data 102C and compresses this sequence based on the presence of m bytes that take special values from a given set. In the compressed output, the in bytes are replaced by an encoding of their special values {$V_0$, $V_1$, ..., $V_{m-1}$} and by and encoding of the index values {$i_0$, $i_1$, ..., $i_{m-1}$} that denote the locations of the bytes.

---

COMPRESS_BYTES_TAKING_SPECIAL_VALUES (b, D)
b = $b_0|b_1|... |b_{n-1}$ ← input sequence of n bytes
D ← mode of operation that takes values from the set
{FREE_CONSTANT, FREE_MAXIMAL}
if (D = FREE_CONSTANT)
m ← number of bytes to search for that take special values; set to a constant value
else // D = FREE_MAXIMAL
m ← highest number of bytes in b that take special values
{$i_0$, $i_1$, ..., $i_{m-1}$} ← indexes of positions of bytes that take special values
$\bar{b}$← {$b_{i0}$, $b_{i1}$, ..., $b_{im-1}$} ← bytes at indexes {$i_0$, $i_1$, ..., $i_{m-1}$} that take special values
if ($\bar{b}$ exists)
{$V_0$, $V_1$, ..., $V_{m-1}$} ← ENCODE_SPECIAL_VALUES ($b_{i0}$, $b_{i1}$, ..., $b_{im-1}$)
{$I_0$, $I_1$, ..., $I_{m-1}$} ← ENCODE_N_CHOOSE_M ($i_0$, $i_1$, ..., $i_{m-1}$) // this is an
//encoding of the indexes $i_0$, $i_1$, ..., $i_{m-1}$
$\bar{b}$← {$\bar{b}_{i0}$, $\bar{b}_{i1}$, ..., $\bar{b}_{in-m-1}$} ← b − $\bar{b}$//this is the set of the remaining elements of b
//if m bytes of $\bar{b}$ that take special values are removed
if (D = FREE_CONSTANT)
c ← $V_0$ | ... | $V_{m-1}$| $I_0$ |... | $I_{m-1}$ | $\bar{b}_{i0}$
| $\bar{b}_{i1}$|... | $\bar{b}_{in-m-1}$ // c is the encoding of the input byte
// sequence b that takes into account the equality of the bytes of the subset $\bar{b}$
else
c ← m |$V_0$ | ... | $V_{m-1}$| $I_0$ |... | $I_{m-1}$ | $\bar{b}_{i0}$
| $\bar{b}_{i1}$| ... | $\bar{b}_{in-m-1}$
if (LENGTH(c) < LENGTH(b)) // savings are realized
return c
else
return Ø
else
return Ø

---

FIG. 5 illustrates, by way of example, a diagram of an embodiment of compressing data 500 based on bytes equal to a value of a variety of special values. The embodiment of FIG. 5 corresponds to operations 108, 208, 128, and 228 of the methods 100 and 200. In the embodiment of FIG. 5, the input data 102C includes ten bytes 502A, 502B, 502C, 502D, 502E, 502F, 502G, 502H, 502I, and 502J that are each equal to one of two special values (e.g., 0x00 and 0xFF). Compressed data 506 includes an encoding 503 indicating which of the two special values each of the bytes 502A-502J is equal to, the indexes 504A-504J of each of the bytes 502A-502J, respectively, remainder data 508 of the data 102C that does not include the bytes 502A-502J that are equal to the special value(s), and data spaces 510 corresponding to space saved from the compression.

In the example of FIG. 5, 10 bytes 502A-502J take special values from the set {0x00, 0xFF}. The total space these bytes occupy is 80 bits. The special values which these bytes 502A-502J take may be encoded, such as by the encoding 503, using 10 bits, where a single bit "0" may be used for encoding the value 0x00 and a single bit "1" may be used for encoding 0xFF. In the compressed output 506 the byte locations may be encoded using 40 bits (or other number of bits) as in the example of byte equality-based compression previously discussed. In this way, 30 bits are freed in the compressed output. That is the data spaces 510 may include 30 free bits.

The compression schemes discussed thus far may be applied not only to bytes but to other entities as well such as 16-bit words, 32-bit double words, or the like. These variants are like the byte-based compression schemes, with the exception that data units are different and the number of possible indexes is reduced, thus reducing space consumed by an index encoding.

In all schemes discussed thus far, decompression follows the reverse order of compression. Encoded indexes are decoded and the locations of compressed data is determined. The values of the compressed are determined, such as by the value provided or an encoding of the values. In the case of compression based on entity (e.g., byte, word, double-word, or the like) equality, a common value is obtained from the compressed input, and this value is replicated to the locations indicated by the encoded indexes. In the case of data taking special values, the special values of the data that are compressed are determined from supplied encodings. When all entity values are determined, the values are inserted in the positions indicated by the decoded indexes. In this way, the original content may be decompressed in a lossless manner.

Pattern checks that compute the sum of the two highest double word frequencies are applicable to memory pointer tables, among other data structures. There are several instances of input data that do not exhibit significant byte or word replications but contain some pairs (1-2 or more) of identical 32-bit or 64-bit sequences. This input data may include a memory pointer table. Pseudocode of a routine that compresses double-word sequences based on the properties of their value histogram is given below. This routine identifies m double words $d_{i0}, d_{i1}, \ldots, d_{im-1}$ at indexes $i_0, i_1, \ldots, i_{m-1}$ which take values from the N highest entries of their value histogram. The threshold N is a given number (for example N=2).

Like other compression schemes discussed, this routine also creates an encoding of the index values where the in double words $d_{i0}, d_{i1}, \ldots, d_{im-1}$ are found and compression is achieved by replacing the in double words dio, $d_{im-1}$ with an encoding of their indexes $i_0, i_1, \ldots, i_{m-1}$ and with the values $H_0, H_1, \ldots, H_{N-1}$ of the N histogram entries the m double words take. To uniquely decompress the output, this routine also computes a mode value M which is placed in the compressed output. This mode value uniquely characterizes the partitioning of the set of m double words into N subsets, where each subset corresponds to a different histogram entry and all double words inside each subset are equal.

```
COMPRESS_BASED_ON_ DOUBLE_WORD_HISTOGRAM (d, D, N)
d = d₀|d₁|... |d_{n-1} ← input sequence of n double words
D ← mode of operation that takes values from the set {FREE_CONSTANT,
FREE_MAXIMAL}
N ← number of highest histogram entries which are taken into account for
compression
if (D = FREE_CONSTANT)
m ← threshold value characterizing the sum of the N highest histogram entries
else // D = FREE_MAXIMAL
m ← the actual sum of the N highest histogram entries
{i₀, i₁, ..., i_{m-1}} ← indexes of double words with values being among the N most
frequent
d̄ ← {d_{i0}, d_{i1}, ..., d_{im-1}} ← double words at indexes {i₀, i₁, ..., d_{im-1}}
M ← mode of compression //uniquely characterizes the partitioning of the set d̄
//into N subsets, where each subset corresponds to a different histogram entry from
//among the N highest ones and all double words inside each subset are equal to
//each other
{H₀, H₁, ..., H_{N-1}} ← the double word values of the N highest histogram entries
if (d̄ exists)
{ĩ₀, ĩ₁, ..., ĩ_{m-1}} ← a reordering of the indexes of the set {i₀, i₁, ..., i_{m-1}} //these
//indexes are partitioned into subsets corresponding to each of the entries of {H₀,
//H₁, ..., H_{N-1}}; indexes of the same subset are placed in adjacent positions and
//the reordering starts from the indexes corresponding to the highest histogram
//entry H0 then moving to H1 and so on; the cardinalities of these subsets are
//implicitly defined by the value of the mode M
{I₀, I₁, ..., I_{m-1}} ← ENCODE_INDEX_SETS (ĩ₀, ĩ₁, ..., ĩ_{m-1}, M) this is an
//encoding of the indexes ĩ₀, ĩ₁, ..., ĩ_{m-1}
d̄ ← {d̄_{i0}, d̄_{i1}, ..., d̄_{in-m-1}} ← d - d̄ //this is the set of the remaining elements of d
//if m double words of d̄ are removed
if (D = FREE_CONSTANT)
c ← M|H₀|H₁|... |H_{N-1}| I₀ |... | I_{m-1} |d̄_{i1}| d̄_{i1}|... | d̄_{in-m-1} // c is the encoding of the
// input byte double word sequence d that considers its histogram //properties
else
```

```
c ← N|M|H_0|H_1|... |H_{N-1}| I_0 | ... | I_{m-1} |d̄_{i1}| d̄_{i1}|... | d̄_{in-m-1}
if (LENGTH(c) < LENGTH(d)) //savings are realized
    return c
else
    return ∅
else
    return ∅
```

A routine that follows the generic algorithmic procedure of the routine 'COMPRESS_BASED_ON_DOUBLE_WORD_HISTOGRAM' but is specific for the values N=2 and m=4 is given below. This routine compresses an input double word sequence if the sum of the two highest double word frequencies is at least four. In this case the mode value M is a single bit value, being either 0 or 1. If M=0 this means that there exists a set of at least three double words which are equal to each other. If M=1 this means that there exist two pairs of double words where double words are equal inside each pair. In both cases the routine works as the generic one. It replaces 3 or 4 double words with their corresponding unique histogram entries, which are either 1 or 2, and with an encoding of the indexes where the double words are found. It also places inside the compressed output the single bit mode value M.

second, different value. Compressed data 606 includes a mode indicating how many pairs (or more) of double-words are equal in the input data 102D, a value 602 of a first pair of respective double-words, a value of a double-word 604 of a second pair of respective double-words, the indexes 607A-607D of each of the double-words 602A-602B and 604A-604B, respectively, remainder data 608 of the data 102D that does not include the double-words 602A-602B and 604A-604B, and data spaces 610 corresponding to space saved from the compression.

The total space the double-words 602A-602B and 604A-604B occupy is 128 bits of the input data 102D. In the compressed output 606, these double-words are represented by their common values, the double-words 602 and 604, which combined occupy 64 bits, and by an encoding of their

```
COMPRESS_ DWORD_HIST_SUM2_EQ_4 (d, M)
d = d_0|d_1| ... |d_{n-1} ← input sequence of n double words
M ← mode of compression // in this case it is a single bit; if M = 0 this means that
//there exists a set of at least three double words which are equal to each other; if M
//= 1 this means that there exist two pairs of double words where double words are
//equal inside each pair
if (d is compressible)
  if (M = 0)
    {i_0, i_1, i_2} ← indexes of double words that are equal
    d̂ ← {d_{i0}, d_{i1}, d_{i2}} ← double words at indexes {i_0, i_1, i_2}
    v ← d_{i0} // v is the common value of d_{i0}, d_{i1}, d_{i2}
    {I_0, I_1, I_2} ← ENCODE_N_CHOOSE_3 (i_0, i_1, i_2) // this is an encoding of
    //the indexes i_0, i_1, i_2
    d̄ ← {d̄_{i0}, d̄_{i1}, ..., d̄_{in-4}} ← d - d̂ //this is the set of the remaining elements of d if
    //the 3 double words of d̂ are removed
    c ← M|v|I_0|I_1|I_2|d̄_{i1}| d̄_{i1}|... | d̄_{in-4}
  else // (M = 1)
    {i_0, i_1, i_2, i_3} ← indexes of two double word pairs where double words are equal
    //per pair
    d̂ ← {d_{i0}, d_{i1}, d_{i2}, d_{i3}} ← double words at indexes {i_0, i_1, i_2, i_3}
    {v, w} ← common values found in the two pairs
    {ĩ_0, ĩ_1, ĩ_2, ĩ_3} ← a reordering of the indexes of the set {i_0, i_1, i_2, i_3} // {ĩ_0, ĩ_1}
    //correspond to the common value v; {ĩ_2, ĩ_3} correspond to the common value w
    {I_0, I_1} ← ENCODE_N_CHOOSE_2 (ĩ_0, ĩ_1) // this is an encoding of the indexes
    //ĩ_0, ĩ_1
    {I_2, I_3} ← ENCODE_N_CHOOSE_2 (ĩ_2, ĩ_3) // this is an encoding of the indexes
    //ĩ_2, ĩ_3
    d̄ ← {d̄_{i0}, d̄_{i1}, ..., d̄_{in-5}} ← d - d̂ //this is the set of the remaining elements of d if
    // the 4 double words of d̂ are removed
    c ← M|v|w|I_0|I_1|I_2|I_3|d̄_{i1}| d̄_{i1}|... | d̄_{in-5}
  if (LENGTH(c) < LENGTH(d)) //savings are achieved
    return c
  else
    return ∅
else
  return ∅
```

FIG. 6 illustrates, by way of example, a diagram of an embodiment of compressing data 600 based on two pairs of double words being present in input data 102D. The embodiment of FIG. 6 corresponds to operations 112, 212, 128, and 228 of the methods 100 and 200. In the embodiment of FIG. 6, the input data 102D includes two double-words 602A and 602B that are each equal to a first value and two other double-words 604A and 604B that are each equal to a indexes 607A-607D which occupies 14 bits. The index encoding requires only 7 bits per pair since one double-word index in each pair may be represented using 4 bits. The other index may be represented using its distance from the first which does not exceed 3 bits. The mode of compression value occupies one bit only. In this way, 49 bits are freed in the compressed output, as represented by the data spaces 610.

When more than one compression technique is used, additional indicator bits may be used to indicate which compression technique(s) are being used. Indicator bits may be used to distinguish between compressible and non-compressible entries and to additionally or alternatively indicate a conflict.

Nibble-based patterns apply to data units that are 'semi-binary'. Sometimes data does not exhibit patterns at the word or byte granularity, but have entropy that is low enough to support security-oriented compression, such as at a nibble level. One example of such data is media data, such as images, video frames, or the like. Such data may include nibble repetitions.

A pattern check may compute a sum of the four highest nibble frequencies in input data. Compressing based on nibble frequency properties may be challenging, at least in part due to indexing a location of the nibble in the input data. Indexing nibbles without loss may include more bits (e.g., 7 bits in a cache line) than the size of the nibbles themselves (4 bits).

Encoding frequent nibbles with fewer bits 'on the spot', i.e., at the exact locations where frequent nibbles are found may be a better option. This option avoids computing and placing encoded nibble indexes in the compressed output. However, it requires solving another problem. It is challenging to distinguish in the compressed output between non-encoded regular values and encoded frequent values. A solution proposed here includes introduce 'signaling' bits in the compressed output to allow reconstruction of the original un-compressed input data in a lossless manner.

FIGS. 7A, 7B, and 7C illustrate, by way of example, data structure diagrams of nibble-histogram-based data encodings 700A, 700B, and 700C, respectively. First, the input data 102 is parsed into nibbles. Then, the four most frequent nibble values are each encoded using two bits. Specifically, frequent nibble values v0, v1, v2, v3 are encoded in numerical order (e.g., ascending or descending numerical order, or the like). The most frequent nibble values may be encoded as {00, 01, 10, 11}, respectively. Encoded frequent values are distinguished from non-encoded regular values by introducing signaling bits in the compressed output that, on the one hand are as few as possible while still allowing for reconstruction of the original uncompressed input without ambiguity.

In this approach, the compressed output includes of a sequence of data, where each sequence is one of the three encodings illustrated in FIGS. 7A-7C. As illustrated in FIG. 7A, data may include a single regular value 704A. In this case, the single regular value is preceded by a single signaling bit 702A equal to '0' in the example of FIG. 7A. The signaling bit indicates that what follows is only one nibble and that the nibble is un-compressed, sometimes called a regular nibble.

As illustrated in FIG. 7B, data may include a single encoded frequent value 706A followed by a single regular nibble 704B. The encoded frequent value 706A may be preceded by two signaling bits 702A and 702B equal to '1' and '0' respectively in the example of FIG. 7B. The signaling bits 702A-702B indicate that what follows is a single encoded frequent value 706A encoded using 2 bits, and a regular value 704B represented "as is". No other signaling bit is required to precede the regular value 704B in this case.

As illustrated in FIG. 7C, data may include a sequence of encoded frequent values 706A-706C followed by an uncompressed single regular or uncompressed frequent value 704C. The length of the sequence of encoded frequent values 706A-706C, in one or more embodiments, may be between (and including) 2 and 5 encoded frequent values, as indicated by length data 708 (e.g., 00 indicates 2 encoded frequent values, 01 indicates three encoded frequent values, and so on}. The encoded frequent values 706A-706C may be preceded by two signaling bits 702A and 702B, both being equal to '1' in the embodiment of FIG. 7C. These signaling bits are followed by two bits that encode the length of the sequence (e.g., the length data 708). Lengths from 2 to 5 are encoded as 2-bit values ranging from 00 to 11. The length data 708 may be followed by the sequence of encoded frequent values 706A-706D, which are encoded using two bits each. The encoded frequent values 706A-706C may be followed and by a non-encoded value which may be either an uncompressed regular value or an uncompressed frequent value. The representation illustrated in FIGS. 7A-7C may characterize any input and it may be used for decompressing any output without ambiguity in a lossless manner.

The routine 'PARSE_BIT_ARRAY', given below in pseudocode, describes the process of converting sequences of nibbles from input data into entities, where each entity is one of the three options of FIGS. 7A-7C. This routine is used as part of the wrapper routine 'COMPRESS_NIBBLE_HIST_SUM4' which is also provided.

```
PARSE_BIT_ARRAY (b, c, D, T, x, E)
b ← input bit array
c ← output bit array
D ← dictionary
T ← dictionary type // may be one of {NO_DICTIONARY, ONE_REG_VALUE,
// ONE_FREQ_VALUE, ONE_REG_AND_ONE_FREQ, FULL_FICTIONARY}
x ← input pointer
E ← frequent value encoding function
n ← number of adjacent frequent values in b starting at position x
q ← ∅ // string to append to c
if (n = 0)
    v ← [b_x: ...: b_{x+3}] // v is the regular value found in b at position x
    q ← 0 | v
    return {c | q, x+4}
else if (n = 1)
    v ← [b_x: ...: b_{x+3}] // v is the frequent value found in b at position x
    w ← [b_{x+4}: ...: b_{x+7}] // w is the regular value found in b at position x+4, which
    //follows v
    q ← 1| 0 |E(v)|w
    return {c | q, x+8}
else if (n ≤ 5)
    {v_0, ..., v_{n-1}} ← sequence of adjacent frequent values found in b at position x
    w ← [b_{x+4n}: ...: b_{x+4n+3}] // w is the regular value found in b at position x+4n
```

```
// which follows the sequence {v_0, ..., v_{n-1}}
q ← 1| 1 |n − 2|E(v_0)| ... |E(v_{n−1})|w
return {c | q, x+4n+4}
else // (n > 5)
{v_0, ..., v_4} ← sequence of 5 adjacent frequent values found in b at position x
w ← [b_{x+20}: ...: b_{x+23}] // w is another frequent value found in b at position x+20
// which follows the sequence {v_0, ..., v_4}; this one does not appear encoded in the
//output
q ← 1| 1 |n − 2|E(v_0)| ... |E(v_4)|w
{D, T} ← UPDATE_DICTIONARY(D, T, w, b)
return {c | q, x+24}
```

A problem, not yet discussed, using the method 100 or 200 may include reducing the size of a dictionary required to perform compression or decompression. In the worst case, a dictionary of size 16 is required for lossless compression. This is the sequence of the frequent values $v_0$, $v_1$, $v_2$, $v_3$ found in the input and placed in ascending order. These values are encoded as {0, 1, 2, 3}. However, the dictionary is not necessary for all inputs. In some input data, the 12 regular nibble values may all be present. Since regular values are represented as they are, the values $v_0$, $v_1$, $v_2$, $v_3$ associated with the four highest nibble histogram entries may be uniquely determined from the regular values present. These are the values which are absent from the compressed output. A dictionary type parameter T is set in this case to the value 'NO DICTIONARY', and no dictionary is required to precede the compressed output.

Conversely, there may be only one regular value absent from the input. In this case, the algorithm still achieves savings in the dictionary description. The dictionary type parameter T is set in this case to the value 'ONE_REQ_VALUE', and a smaller dictionary consisting of a single value, which is the absent regular one, may be used. This value must precede the compressed output and together with the other non-encoded regular values uniquely determines the four highest nibble histogram entries $v_0$, $v_1$, $v_2$, $v_3$. These mechanisms are described in the pseudocode of the routine 'INIT_DICTIONARY' below.

```
INIT_DICTIONARY (b, v_0, v_1, v_2, v_3)
b ← input bit array
{v_0, v_1, v_2, v_3} ← the four highest nibble histogram entries associated with b //
//these are also denoted as 'frequent' values; all others are 'regular'
values; they
//are in ascending order
if (all regular values are present in b)
D ← Ø
T ← NO_DICTIONARY
return {D, T}
else if (at most one regular value is absent from b)
w ← the regular value which is absent from b
D ← w
T ← ONE_REG_VALUE
return {D, T}
else // more than one regular value is absent from b
D ← v_0 |v_1|v_2|v_3
T ← FULL_DICTIONARY
return {D, T}
```

After a dictionary is initialized, it may be modified during the parsing of the input. A dictionary may be modified if there is a need to represent a frequent value as is. This happens only in the case where a frequent value follows a sequence of other frequent values (as in the option of FIG. 7C) or if a frequent value is the last value found in the input. The first time such frequent value is parsed, the dictionary may be updated. If the dictionary is of type 'NO_DICTIONARY' the dictionary may set to type 'ONE_FREQ_VALUE' and is updated to include the frequent value parsed. If the dictionary is of type 'ONE_REG_VALUE' the dictionary is set to type 'ONE_REG_AND_ONE_FREQ' and may be updated to include the frequent value parsed in addition to the regular value it contains. In all other cases, the dictionary may be set to 'FULL_DICTIONARY' and may be updated to include all frequent values. These mechanisms are described in the routine 'UPDATE_DICTIONARY' found below.

```
UPDATE_DICTIONARY (D, T, w, b)
D ← dictionary
T ← dictionary type
w ← a frequent value which does not appear encoded in the output
b ← input bit array
if (T = NO_DICTIONARY)
D ← w
T ← ONE_FREQ_VALUE
return {D, T}
else if (T = ONE_REG_VALUE)
D ← D | w
T ← ONE_REG_AND_ONE_FREQ
return {D, T}
else
{v_0, v_1, v_2, v_3} ← the four highest nibble histogram entries associated with b
D ← v_0 |v_1|v_2|v_3
T ← FULL_DICTIONARY
return {D, T}
COMPRESS_NIBBLE_HIST_SUM4(b)
b ← input bit array
c ← Ø //output bit array
x ← 0 //input read pointer
y ← 0 // pointer returned by the parse function
{v_0, v_1, v_2, v_3} ← four highest nibble histogram entries associated with b in ascending order
E ← SIMPLE_ENCODE_FUNCTION // encodes v_0 as 0, v_1 as 1, v_2 as 2 and v_3
//as 3
{D, T} ← INIT_DICTIONARY(b, v_0, v_1, v_2, v_3)
while (y ≤ LENGTH(b))
{c, y} ← PARSE_BIT_ARRAY(b, c, D, T, x, E)
x ← y
c ← T |D|c
if (LENGTH(c) < LENGTH(b)) //savings are achieved
return c
else
return Ø
```

FIG. 8 illustrates, by way of example, a diagram of an embodiment of compressing data 800 based on nibble-histogram-based compression of input data 102E. The embodiment of FIG. 8 corresponds to operations 114, 214, 128, and 228 of the methods 100 and 200. In the embodiment of FIG. 8, the input data 102E includes runs of regular values 801A, 801B, 801C, 801D, and 801E that are each equal to a nibble value that is not one of the frequent nibble values and runs of frequent values 802A, 802B, 802C, and 802D. Compressed data 806 includes dictionary bits 803 indicating which type of dictionary is needed to decompress the data (e.g., 3 bits in some embodiments), encoded runs of regular data 808A, 808B, 808C, 808D, and 808E, encoded runs of frequent values 804A, 804B, 804C and 804D, and saved data space 810. Each of the nibbles of the runs of regular data 808A-808E is encoded as described about FIG. 7A. Each of the runs of frequent nibble values 804A-804D is encoded as described regarding one of FIGS. 7B-7C.

Consider an embodiment in which the input data 102E includes 70 nibbles taking values from the four most frequently occurring nibbles in the input data 102E. The total space these nibbles occupy is 280 bits. Further assume that these nibbles are arranged into 14 sequences, denoted as 'islands', of 5 nibbles apiece. In the input data 102E, there are also 58 other nibbles situated either in front of, in between, or after the islands taking regular values, which are different from the 4 frequent values. Assume that all 12 regular values are present in the input data 102E. In the compressed output 806, each island is encoded using 18 bits. From these bits, 2 bits are used for signaling, 2 bits are used for length encoding, 10 bits are used for representing the 5 frequent values of each island and 4 bits are used for representing the regular value that follows. From the 58 regular values of the input, 14 regular values participate in island encodings. Each of the remaining 44 regular values requires 5 bits to be represented, because of the need to prepend a '0' signaling bit to each value (see FIG. 7A and the corresponding description thereof). In this example, nibble based compression frees 37 bits in the compressed output, such that the saved data spaces 810 are 37 bits. Each frequent value requires an average of 18/5=3.6 bits to be represented, and each regular value requires an average of (44×5+14×4)/58=4.76 bits to be represented. Because of its complexity, this technique is difficult to implement using low latency, area, efficient hardware. Compared to other schemes which are suitable to memory corruption detection, this technique is more suitable to applications with less stringent latency requirements such as storage and communications applications. This technique has an empirical pass rate of 96.89% and an average freed space value of 67 bits over those data sets.

One problem that may be addressed in most of the schemes discussed above is how to efficiently encode the indexes of data that participate in the various compression schemes. This problem may be efficiently represented by combinations of k elements out of n, ideally with minimal number of bits. Such combinations are typically denoted as k-combinations in the literature. While a combinatorial number system may be used, which provides a one-to-one mapping between the set of natural numbers and the set of k-combinations, the overhead of using such number system may be significant, especially affecting the decoding process. This approach may be essentially impractical for security-oriented compression purposes. Techniques are proposed that may efficiently encode k-combinations with minimal number of bits, which provide results that are close enough to the theoretical bound associated with the use of a combinatorial number system.

Consider the case of encoding a combination of 2 elements out of n with $\log_2(n) \times 2 - 1$ bits. A lower bound of the number of bits needed may be obtained in this case as $L = \log_2(n \times (n-1)/2) = \log_2(n) + \log_2(n-1) - 1$. An encoding scheme given below outputs a first encoding $x_0$, which is $\log_2(n)$ bits long, and a second encoding $x_1$ which is $\log_2(n)-1$ bits long. The first encoding is just the index associated with a first entity position. The second encoding is the distance of the position of a second entity from the first entity position.

```
ENCODING_N_CHOOSE_2 (p₀, p₁)
{p₀, p₁} ← indexes of two chosen elements (p₀<p₁)
delta₀ ← p₁-p₀
delta₁ ← p₀-p₁+n
k ← find k such that deltaₖ ≤ n/2
x₀ ← pₖ
x₁ ← deltaₖ - 1
return {x₀, x₁}
DECODING_N_CHOOSE_2 (x₀, x₁)
p₀ ← x₀
p₁ ← (x₀+x₁+1) mod n
{p₀, p₁} ← SORT(p₀, p₁)
return {p₀, p₁}
```

The encoding and decoding processes may be proven to be functionally correct as follows. There are in total n positions. Therefore $\log_2(n)$ bits may encode any of the positions. If the parameter $delta_0$ in the code above satisfies $delta_0 \le n/2$, then $0 \le delta_0 \le n/2-1$ and the returned value $x_1$ is equal to $delta_{0-1}$. This value may be encoded with $\log_2(n)-1$ bits. If $delta_0 > n/2$, then $delta_1 \le n/2$ and $0 \le n-delta_1-1 \le n/2-1$. In this case the returned value $x_1$ is equal to $delta_1-1$. This value may also be encoded with $\log_2(n)-1$ bits.

The case of encoding a combination of 3 elements of n elements is a little more complicated than the case previously discussed. A lower bound of the number of bits needed for this encoding may be obtained in this case as: $L = \log_2(n \times (n-1) \times (n-2)/(2 \times 3)) = \log_2(n) + \log_2(n-1) + \log_2(n-2) - 1.58 - 1$. The encoding scheme discussed below outputs a first encoding $x_0$, which is $\log_2(n)$ bits long, a second encoding $x_1$ which is $\log_2(n)-1$ bits long, and a third encoding $x_2$ which is also $\log_2(n)-1$ bits long. The first encoding is the index associated with a first entity position. The second encoding is the distance of the position of a second entity from the first entity position. The third encoding is the distance of the position of a third entity from the second entity position.

```
ENCODING_N_CHOOSE_3 (p₀, p₁, p₂)
{p₀, p₁, p₂} ← indexes of three chosen elements p₀, p₁, p₂ (p₀<p₁<p₂)
delta₀ ← p₁-p₀
delta₁ ← p₂-p₁
delta₂ ← p₀-p₂+n
k ← find k such that deltaₖ ≤ n/2 and delta deltaₖ₊₁ mod 3 ≤ n/2
x₀ ← pₖ
x₁ ← deltaₖ - 1
x₂ ← deltaₖ₊₁ mod 3 - 1
return {x₀, x₁, x₂}
DECODING_N_CHOOSE_3 (x₀, x₁, x₂)
p₀ ← x₀
p₁ ← (x₀+x₁+1) mod n
p₂ ← (x₀+x₁+x₂+2) mod n
{p₀, p₁, p₂} ← SORT(p₀, p₁, p₂)
return {p₀, p₁, p₂}
```

In this routine, a k, such that $delta_k \le n/2$ and $delta_{k+1} \mod 3 \le n/2$ may be found. By definition, $delta_0 + delta_1 + delta_2 = n$ always holds. Let $i_{max}$ denote the index of the maximum of the three delta values. If $delta_{i_{max}} \le n/2$, and k=0, 1, 2 then all delta values satisfy $delta_k \le n/2$ and $delta_{k+1} \mod 3 \le n/2$. If, on the other hand $delta_{i_{max}} > n/2$, the sum of the other two delta values less than n/2. Therefore, it holds that these two delta values are smaller or equal to n/2 separately.

The n choose 2 and n choose 3 encodings may be generalized and it may be shown that n choose k combinations may be encoded using $\log_2(n) \times k - (k-1)$ bits. For the special case of encoding n choose 4 combinations one fewer bit (using only $\log_2(n) \times 4 - 4$ bits) may be used. The procedure is discussed below.

As with all other cases, a lower bound on the number of bits needed for encoding such combinations may be obtained as: $L = \log_2(n \times (n-1) \times (n-2) \times (n-3)/(2 \times 3 \times 4)) = \log_2(n) + \log_2(n-1) + \log_2(n-2) + \log_2(n-3) - 1 - 1.58 - 2$. An encoding scheme outputs a first encoding $x_0$, which is $\log_2(n)$ bits long, a second encoding $x_1$ which is $\log_2(n) - 1$ bits long, a third encoding $x_2$ which is $\log_2(n) - 2$ bits long and a fourth encoding $x_3$ which is also $\log_2(n) - 2$ bits long. It also outputs a single mode bit, which is required by the decoding process. The first encoding is the index associated with a first entity position. The second encoding is the distance of the position of a second entity from the first entity position. The third encoding is the distance of the position of a third entity from the second entity position. Depending on the value of the mode bit, the fourth encoding is either the distance of the position of a fourth entity from the third entity position or from the first entity position.

that $\text{delta}_{(imax+2)} \bmod 4 = \text{double\_delta}_{(imax+1)} \bmod 4 - \text{delta}_{(imax+1)} \bmod 4 > n/4$. Therefore, the value $k \leftarrow (i_{max}+3) \bmod 4$ satisfies the desired constrains for k. In a second sub-case, assume that $\text{delta}_{(imax+1)} \bmod 4 > n/4$. Here, $\text{double\_delta}_{(imax+2)} \bmod 4 = n - \text{delta}_{(imax+1)} \bmod 4 - \text{delta}_{imax} < n/2$ and $\text{delta}_{(imax+1)} \bmod 4 > n/4$. Again, there exists a value $k \leftarrow (i_{max}+2) \bmod 4$ which satisfies the desired constrains for k. Thus, a k that satisfies the conditions may always be found, and used to encode the input elements.

When considering larger numbers of combination such as sixty-four choose ten other effective encoding variants of the procedures above may be used. For example, the 64 elements may be split into four 16-element segments and 10 bits may be used to encode the number of chosen elements in each segment. Further, 34 bits may be used to encode the offset of each chosen element inside its segment. If one of the segments has more than 7 elements chosen, consider this case as being represented by a single mode bit being equal to '0'. In this case, 2 bits may be used to indicate which segment has more than 7 elements, 2 additional bits may be

```
ENCODING_N_CHOOSE_4 (p₀, p₁, p₂, p₃)
{p₀, p₁, p₂, p₃} ← indexes of four chosen elements p₀, p₁, p₂, p₃ (p₀<p₁<p₂<p₃)
delta₀ ← p₁-p₀
delta₁ ← p₂-p₁
delta₂ ← p₃-p₂
delta₃ ← p₀-p₃+n
double_delta₀ ← p₂-p₀
double_delta₁ ← p₃-p₁
double_delta₂ ← p₀-p₂+n
double_delta₃ ← p₁-p₃+n
k ← find k such that delta(k-1) mod 4 ≥ n/4 and double_deltaₖ ≤ n/2
x₀ ← pₖ
if (delta(k-1) mod 4 > n/2)
mode ← 0
//p(k+1) mod 4, p(k+2) mod 4, p(k+3) mod 4 are three elements with distance ∈ [1,
n/2] to pₖ. // this property may be accounted for to encode n/2-choose-3 elements
//using log₂(n/2) × 3-2 bits
{x₁, x₂, x₃} ← ENCODING_N_CHOOSE_3(deltaₖ, delta(k+1) mod 4, delta(k+2) mod 4)
//in the encoding above n/2 bits are used in the place of N
else // delta(k-1) mod 4 ≤ n/2
mode ← 1
//p(k+1) mod 4 and p(k+2) mod 4 are two elements with distance ∈ [1, n/2] to pₖ.
// this property may be accounted for to encode n/2-choose-2 elements using
//log2(n/2) × 2-1 bits
{x₁, x₂} ← ENCODING_N_CHOOSE_2(deltaₖ, delta(k+1) mod 4)
//in the encoding above n/2 bits are used in place of N
x₃ ← (p(k+3) mod 4 - (pₖ + n/2) -1 + n) mod n
return {x₀, x₁, x₂, x₃, mode}
    DECODING_N_CHOOSE_4 (x₀, x₁, x₂, x₃, mode)
p₀ ← x₀
p₁ ← (x₀+x₁+1) mod n
p₂ ← (x₀+(x₁+x₂+2) mod n/2) mod n
if (mode = 0)
p₃ ← (x₀+(x₁+x₂+x₃+3) mod n/2) mod n
else //mode = 1
p₃ ← (x₀+n/2+x₃+1) mod n
{p₀, p₁, p₂, p₃} ← SORT(p₀, p₁, p₂, p₃)
return {p₀, p₁, p₂, p₃}
```

A k may be found such that $\text{delta}_{(k-1)} \bmod 4 \geq n/4$ and $\text{double\_delta}_k \leq n/2$. From the code above it is evident that $\text{delta}_0 + \text{delta}_1 + \text{delta}_2 + \text{delta}_3 = n$. Let $i_{max}$ denote the index of the maximum of the four delta values. It holds that $\text{delta}_{imax} \geq n/4$. Indeed, if $\text{delta}_{imax} < n/4$ then $\text{delta}_0 + \text{delta}_1 + \text{delta}_2 + \text{delta}_3 < n$. This contradicts with the fact that the delta values sum up to n. If $\text{double\_delta}_{(imax+1)} \bmod 4 \leq n/2$, then a value $k \leftarrow (i_{max}+1) \bmod 4$ satisfies the constrains for k. Otherwise, if $\text{double\_delta}_{(imax+1)} \bmod 4 > n/2$, there are two sub-cases. First, assume that $\text{delta}_{(imax+1)} \bmod 4 \leq n/4$. The value $\text{double\_delta}_{(imax+3)} \bmod 4$ is smaller or equal to n/2 as it is equal to $n - \text{double\_delta}_{(imax+1)} \bmod 4$. It also holds used to indicate the exact number of chosen elements this segment contains (i.e., 8, 9, or 10) and 2 more pairs of 2 bits may be used to indicate the segments where 2 or less elements are located.

In another case all 4 segments contain less or equal than 7 elements. Here, the mode bit may be equal to '1' and 3 sets of 3 bits indicate the number of chosen elements located inside the first three segments. In total, 10 bits are needed to indicate the number of chosen elements found in each segment. Moreover, $4 \times 4 + 6 \times 3 = 34$ bits may be used to indicate the offsets of the 10 chosen elements within each segment. Such a technique is costly to implement in hardware. In an implementation of a compression scheme based on 10 bytes being equal, 6 bits may be allocated for a first index and a sequence of 5, 4, 4, 4, 4, 4, 3, 3 and 3 bit lengths for the increments of index values associated with the remaining 9 bytes. Such heuristic algorithm may not reduce the number of compressible cache lines significantly. Specifically, a reduction in compressibility rates from 77.35% to 73.37% was found in empirical data.

A final variant considered represents positions of 11 bytes of 64 bytes using 48 bits. This variant may free up to 32 bits in input data. This variant is similar to the sixty-four choose ten variants with few differences. First, the 64 elements are split into four 16-element (each element one byte long) segments. Then use 11 bits to encode the number of chosen elements in each segment and 37 bits to encode the offset of each chosen element inside its segment. If one of the segment contains more than 7 elements, a mode bit may be set to '0'. 2 bits may be used to indicate the segment which has more than 7 elements, 2 bits to indicate the number of chosen elements the segment contains, (8, 9, 10 or 11) and 3 sets of 2 bits to indicate the segments where the remaining 3 or less elements are located. In another case, where the mode bit is '1', all 4 segments contain less or equal than 7 elements. In this case, 3 sets of 3 bits are used to indicate the number of chosen elements located inside the first three segments. In total, 11 bits are needed to indicate the number of chosen elements in each segment and 4×4+7×3=37 bits are needed to indicate the offsets of the 11 chosen elements inside each segment.

Compression techniques discussed have been implemented in software and some compression techniques, which are suitable for hardware acceleration, have been implemented. Pass rates and synthesis results associated with compression techniques are provided in the Table illustrated in FIG. 9. Synthesis results are produced using the 14 nm technology library, and for the clock frequency of 1.67 GHz. Table 1 shows optimized area requirements for compression circuits based on detecting repeated and adjacent bytes, repeated words, bytes taking special values and sums of the highest two double word frequencies exceeding a threshold. A security-oriented compression circuit analysis shows reasonable area requirement for these circuits. When all pattern-based techniques are combined together, the compression circuits may successfully compress-decompress 82.92% of representative workload input data requiring a 3-clock latency and 8 K square microns for decompression and an 8-clock latency and 71 K square microns for compression. Several other variants with different pass rates, latency and area requirements are evaluated in Table of FIG. 9.

Example Computer System Implementations:

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors to carry out the operations described herein. Modules may be hardware modules, and as such, modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term "hardware module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 10:
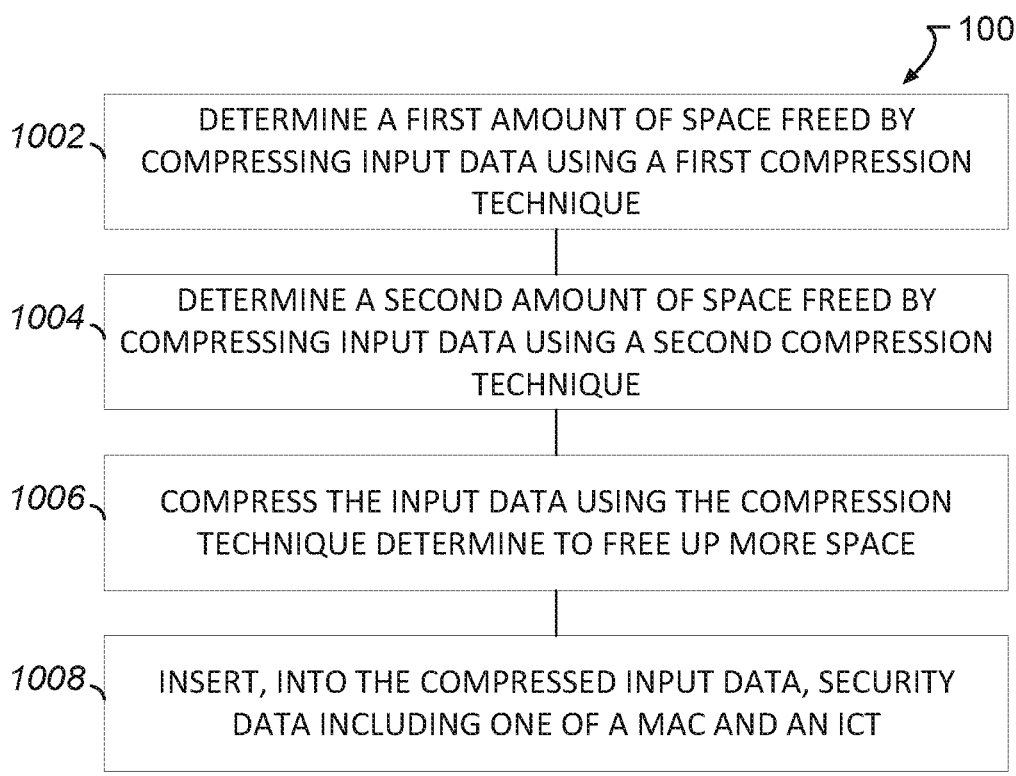
FIG. 10 illustrates, by way of example, a diagram of an embodiment of a method of security-oriented compression.

FIG. 10 illustrates, by way of example, a diagram of an embodiment of a method 1000 of security-oriented compression. The method 1000 as illustrated includes determining a first of space freed by compressing input data using a first compression technique, at operation 1002; determining a second amount of space freed by compressing the input data using a second compression technique, at operation 1004; compressing the input data using the compression technique determined to free up more space, at operation 1006; and inserting, into the compressed input data, security data including one of a MAC and an ICT, at operation 1008. The method 1000 may be performed by processing circuitry of a device, instructions performed by a machine of a machine-readable medium, or the like.

The method 1000 may further include, wherein the first and second compression technique include a respective different one of byte-equality compression, adjacent byte-equality compression, special-value compression, word-equality compression, double-word histogram compression, and nibble histogram compression. The method 1000 may further include, wherein the first and second compression technique include a respective different one of byte-equality compression, adjacent byte-equality compression, special-value compression, word-equality compression, double-word histogram compression, and nibble histogram compression.

The method 1000 may further include, wherein the first compression technique includes the byte-equality compression, and the determination of the first amount of space freed includes the processing circuitry to determine whether the input data includes greater than a threshold number of bytes that are equal to each other. The method 1000 may further include, wherein the first compression technique includes the byte-equality compression, and the determination of the first amount of space freed includes the processing circuitry to determine a maximum number of bytes that are equal to each other.

The method 1000 may further include; wherein the first compression technique includes the nibble histogram compression. The method 1000 may further include inserting, into the compressed input data, dictionary bits indicating which nibble values are compressed and which nibble values are un-compressed in the compressed input data. The method 1000 may further include, wherein the dictionary bits include only two bits or only three bits, wherein a first value of the dictionary bits indicates that no dictionary is provided in the compressed input data, a second value of the dictionary bits indicates that a dictionary of a single un-compressed nibble value is provided in the compressed input data, and a third value of the dictionary bits indicates that a full dictionary of four nibble values is provided in the compressed input data. The method 1000 may further include, wherein the dictionary bits further include a third value indicating that a frequent value appears un-compressed in the compressed input data. The method 1000 may further include parsing the input data into nibbles and determine, of sixteen possible nibble values, which four nibble values occur most frequently in the parsed input data.

The method 1000 may further include encoding the four most frequent nibble values using two bits each. The method 1000 may further include replacing each of the most frequent nibble values in the input data with the corresponding encoding. The method 1000 may further include inserting in front of each nibble in the input data that is not equal to one of the nibble values that occur most frequently, a single bit indicating that the nibble value is a regular value. The method 1000 may further include inserting, in front of each of the four nibble values that occur most frequently and directly follows a regular value, two bits indicating whether consecutive frequent values or a single frequent value follows.

Figure 11:
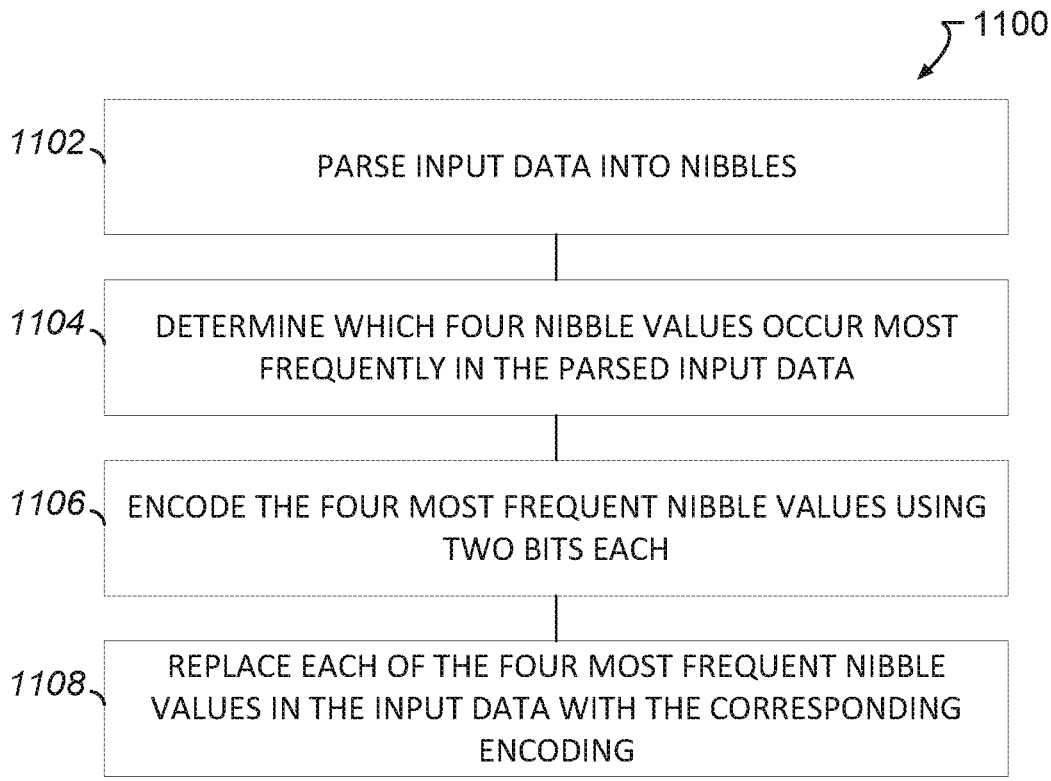
FIG. 11 illustrates, by way of example, a diagram of an embodiment of a method of nibble-histogram based compression.

FIG. 11 illustrates, by way of example, a diagram of an embodiment of a method 1100 of nibble-histogram based compression. The method 1100 as illustrated includes parsing input data into nibbles, at operation 1102; determining which four nibble values occur most frequently in the parsed input data, at operation 1104; encoding the four most frequent nibble values using two bits each, at operation 1106; and replacing occurrences of each of the four most frequent) nibble values in the input data with the corresponding encoding, at operation 1108. The method 1100 may be performed by processing circuitry of a device, instructions performed by a machine of a machine-readable medium, or the like.

The method 1100 may further include inserting, in front of each nibble in the input data that is not equal to one of the nibble values that occur most frequently, a single bit indicating that the nibble value is a regular value. The method 1100 may further include inserting, in front of each of the four nibble values that occur most frequently and directly follows a regular value, two bits indicating whether consecutive frequent values or a single frequent value follows.

The method 1100 may further include inserting into the compressed input data dictionary bits indicating which nibble values are compressed and which nibble values are un-compressed in the compressed input data. The method 1100 may further include, wherein the dictionary bits include only two bits or only three bits, wherein a first value of the dictionary bits indicates that no dictionary is provided in the compressed input data, a second value of the dictionary bits indicates that a dictionary of a single un-compressed nibble value is provided in the compressed input data, and a third value of the dictionary bits indicates that a full dictionary of four nibble values is provided in the compressed input data. The method 1100 may further include, wherein the dictionary bits further include a third value indicating that a frequent value appears un-compressed in the compressed input data.

Figure 12:
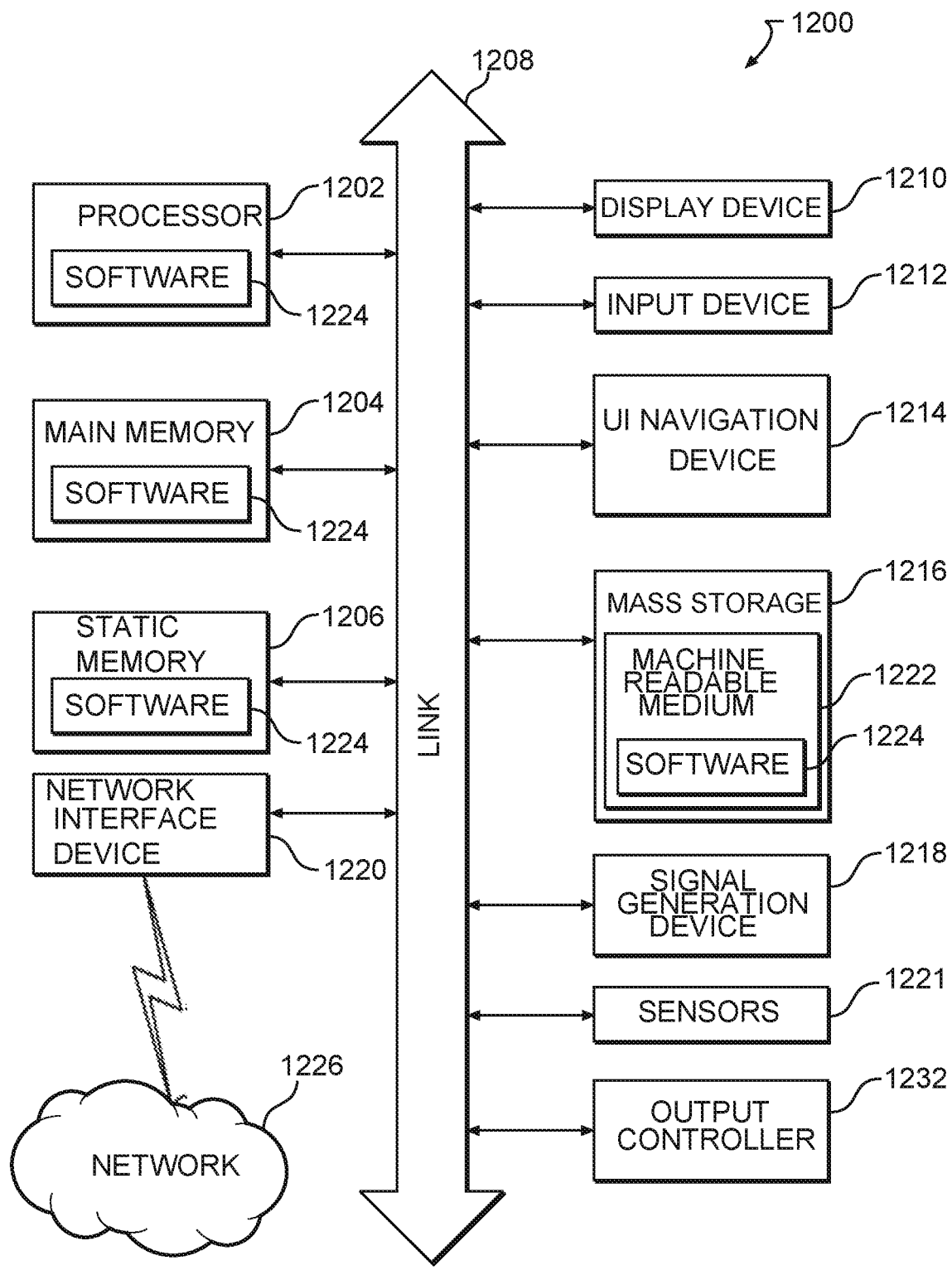
FIG. 12 is a block diagram illustrating a machine in the example form of a computer system, within which a set or sequence of instructions may be executed to cause the machine to perform any one of the methodologies discussed herein, according to an example embodiment.

FIG. 12 is a block diagram illustrating a machine in the example form of a computer system 1200, within which a set or sequence of instructions may be executed to cause the machine to perform any one of the methodologies discussed herein, according to an example embodiment. For example, the method described above with reference to FIGS. 1, 2, 10, and 11 may be performed using at least a portion of the computer system 1200.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, an ADAS, an apparatus of an autonomous driving vehicle, a wearable device, a personal computer (PC), a tablet PC, a hybrid tablet, a personal digital assistant (PDA), a mobile telephone (e.g., a smartphone), or any machine capable of executing instructions (sequential or otherwise) that specify actions to be taken by that machine. Further, while only a single machine is illustrated, the terra "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein. For instance, a portion of the computer system 1200 may execute instructions to perform the method described above with reference to FIGS. 1, 2, 10 and 11.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via a link 1208 (e.g., bus). The computer system 1200 may further include a video display device 1210, an input device 1212 (e.g., an alphanumeric input device such as keyboard or keypad, a touchpad, a microphone, a camera, or components of a virtual reality/VR headset such as buttons), and a user interface (UI) navigation device 1214 (e.g., a mouse, a stylus, or a pointing device). In one embodiment, the video display device 1210, input device 1212 and UI navigation device 1214 are incorporated into a touch screen display (e.g., a touch sensitive display device).

The computer system 1200 may additionally include a storage device 1216 (e.g., a drive unit), a signal generation device 1218 (e.g., a speaker), a network interface device 1220, and one or more sensors 1221, such as an RFID reader, a global positioning system (GPS) sensor, a camera, a compass, an accelerometer, a gyrometer, a magnetometer, or other sensors. The computer system 1200 may also include an output controller 1232, such as a serial (e.g., universal serial bus (USB), parallel, or other wired or wireless (e.g., IR, near field communication (NFC), etc.) connection to communicate or control one or more peripheral devices (e.g., a printer, card reader, etc.). In some embodiments, the processor 1202 or instructions 1224 (e.g., software in the example shown in FIG. 12) comprises processing circuitry or transceiver circuitry. The processing circuitry may include one or electric or electronic components, such as one or more transistors, resistors, capacitors, inductors, diodes, regulators, analog to digital converters, digital to analog converters, logic gates (e.g., AND, OR, NAND, NOR, XOR, or other logic gates), multiplexers, modulators, switches, power supplies, or the like.

The storage device 1216 includes a machine-readable medium 1222 on which is stored one or more sets of data structures and instructions 1224 (e.g., software) embodying or utilized by any one or more of the methodologies or functions described herein. For example, the computer system 1200 may execute instructions 1224 to perform the method described above with reference to FIG. 2.

The instructions 1224 may also reside, completely or at least partially, within the main memory 1204, static memory 1206, or within the processor 1202 during execution thereof by the computer system 1200, with the main memory 1204, static memory 1206, and the processor 1202 also constituting machine-readable media 1222.

While the machine-readable medium 1222 is illustrated in an example embodiment to be a single medium, the term "machine-readable medium" may include a single medium or multiple media (e.g., a centralized or distributed database, or associated caches and servers) that store the one or more instructions 1224. The term "machine-readable medium" shall also be taken to include any tangible medium that is capable of storing, encoding or carrying instructions 1224 for execution by the machine and that cause the machine to perform any one or more of the methodologies of the present disclosure or that is capable of storing, encoding or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The network interface device 1220 may transmit and receive data over a transmission medium, which may be wired or wireless (e.g., radio frequency, infrared or visible light spectra, etc.), fiber optics, or the like, to network 1226.

Network interface device 1220, according to various embodiments, may take any suitable form factor. In one such embodiment, network interface device 1220 is in the form of a network interface card (NIC) that interfaces with processor 1202 via link 1208. In one example, link 1208 includes a PCI Express (PCIe) bus, including a slot into which the NIC form-factor may removably engage. In another embodiment, network interface device 1220 is a network interface circuit laid out on a motherboard together with local link circuitry, processor interface circuitry, other input/output circuitry, memory circuitry, storage device and peripheral controller circuitry, and the like. In another embodiment, network interface device 1220 is a peripheral that interfaces with link 1208 via a peripheral input/output port such as a universal serial bus (USB) port.

EXAMPLES

Example 1 is a device comprising an input port to receive input data to be compressed, and processing circuitry coupled to receive the input data from the input port, the processing circuitry to determine a first amount of space freed by compressing the input data using a first compression technique, determine a second amount of space freed by compressing the input data using a second, different compression technique, compress the input data using the compression technique of the first and second compression techniques determined to free up more space to create compressed input data, and insert into the compressed input data, security data including one of a message authentication control (MAC) and an inventory control tag (ICT).

In Example 2, the subject matter of Example 1 includes, wherein the first and second compression technique include a respective different one of byte-equality compression, adjacent byte-equality compression, special-value compression, word-equality compression, double-word histogram compression, and nibble histogram compression.

In Example 3, the subject matter of at least one of Examples 1-2 further includes, wherein the first compression technique includes the byte-equality compression, and the determination of the first amount of space freed includes the processing circuitry to determine whether the input data includes greater than a threshold number of bytes that are equal to each other.

In Example 4, the subject matter of at least one of Examples 1-3 further includes, wherein the first compression technique includes the byte-equality compression, and the determination of the first amount of space freed includes the processing circuitry to determine a maximum number of bytes that are equal to each other.

In Example 5, the subject matter of at least one of Examples 1-4 further includes, wherein the first compression technique includes the nibble histogram compression.

In Example 6, the subject matter of Example 5 further includes, wherein the processing circuitry is further to insert, into the compressed input data, dictionary bits indicating which nibble values are compressed and which nibble values are un-compressed in the compressed input data.

In Example 7, the subject matter of Example 6 further includes, wherein the dictionary bits include only two bits or only three bits, wherein a first value of the dictionary bits indicates that no dictionary is provided in the compressed input data, a second value of the dictionary bits indicates that a dictionary of a single un-compressed nibble value is provided in the compressed input data, and a third value of the dictionary bits indicates that a full dictionary of four nibble values is provided in the compressed input data.

In Example 8, the subject matter of Example 7 further includes, wherein the dictionary bits further include a third value indicating that a frequent value appears un-compressed in the compressed input data.

In Example 9, the subject matter of Example 8 further includes parsing the input data into nibbles and determine, of sixteen possible nibble values, which four nibble values occur most frequently in the parsed input data, encoding the four most frequent nibble values using two bits each, and replacing each of the most frequent nibble values in the input data with the corresponding encoding.

In Example 10, the subject matter of Example 9 further includes, inserting in front of each nibble in the input data that is not equal to one of the nibble values that occur most frequently, a single bit indicating that the nibble value is a regular value.

In Example 11, the subject matter of Example 10 further includes, wherein the processing circuitry is further to insert, in front of each of the four nibble values that occur most frequently and directly follows a regular value, two bits indicating whether consecutive frequent values or a single frequent value immediately follows.

Example 12 is a method comprising determining a first amount of space freed by compressing the input data using a first compression technique, determining a second amount of space freed by compressing the input data using a second, different compression technique, compressing the input data using the compression technique of the first and second compression techniques determined to free up more space to create compressed input data, and inserting into the compressed input data, security data including one of a message authentication control (MAC) and an inventory control tag (ICT).

In Example 13, the subject matter of Example 12 further includes, wherein the first and second compression technique include a respective different one of byte-equality compression, adjacent byte-equality compression, special-value compression, word-equality compression, double-word histogram compression, and nibble histogram compression.

In Example 14, the subject matter of at least one of Examples 12-13 further includes, wherein the first compression technique includes the byte-equality compression, and the determination of the first amount of space freed includes the processing circuitry to determine whether the input data includes greater than a threshold number of bytes that are equal to each other.

In Example 15, the subject matter of at least one of Examples 12-14 further includes, wherein the first compression technique includes the byte-equality compression, and the determination of the first amount of space freed includes the processing circuitry to determine a maximum number of bytes that are equal to each other.

In Example 16, the subject matter of at least one of Examples 12-15 further includes, wherein the first compression technique includes the nibble histogram compression.

In Example 17, the subject matter of Example 16 further includes, inserting, into the compressed input data, dictionary bits indicating which nibble values are compressed and which nibble values are un-compressed in the compressed input data.

In Example 18, the subject matter of Example 17 further includes, wherein the dictionary bits include only two bits or only three bits, wherein a first value of the dictionary bits indicates that no dictionary is provided in the compressed input data, a second value of the dictionary bits indicates that a dictionary of a single un-compressed nibble value is provided in the compressed input data, and a third value of the dictionary bits indicates that a full dictionary of four nibble values is provided in the compressed input data.

In Example 19, the subject matter of Example 18 further includes, wherein the dictionary bits further include a third value indicating that a frequent value appears un-compressed in the compressed input data.

In Example 20, the subject matter of Example 19 further includes parsing the input data into nibbles and determine, of sixteen possible nibble values, which four nibble values occur most frequently in the parsed input data, encoding the four most frequent nibble values using two bits each, and replacing each of the most frequent nibble values in the input data with the corresponding encoding.

In Example 21, the subject matter of Example 20 further includes, wherein further comprising inserting in front of each nibble in the input data that is not equal to one of the nibble values that occur most frequently, a single bit indicating that the nibble value is a regular value.

In Example 22, the subject matter of Example 21 further includes, inserting, in front of each of the four nibble values that occur most frequently and directly follows a regular value, two bits indicating whether consecutive frequent values or a single frequent value immediately follows.

Example 23 is a machine-readable medium including instructions that, when executed by a machine, configure the machine to perform operations comprising: determining a first amount of space freed by compressing the input data using a first compression technique, determining a second amount of space freed by compressing the input data using a second, different compression technique, compressing the input data using the compression technique of the first and second compression techniques determined to free up more space to create compressed input data, and inserting into the compressed input data, security data including one of a message authentication control (MAC) and an inventory control tag (ICT).

In Example 24, the subject matter of Example 23 further includes, wherein the first and second compression technique include a respective different one of byte-equality compression, adjacent byte-equality compression, special-value compression, word-equality compression, double-word histogram compression, and nibble histogram compression.

In Example 25, the subject matter of at least one of Examples 23-24 further includes, wherein the first compression technique includes the byte-equality compression, and the determination of the first amount of space freed includes the processing circuitry to determine whether the input data includes greater than a threshold number of bytes that are equal to each other.

In Example 26, the subject matter of at least one of Examples 23-25, wherein the first compression technique includes the byte-equality compression, and the determination of the first amount of space freed includes the processing circuitry to determine a maximum number of bytes that are equal to each other.

In Example 27, the subject matter of at least one of Examples 23-26 further includes, wherein the first compression technique includes the nibble histogram compression.

In Example 28, the subject matter of Example 27 further includes, wherein the operations further comprise inserting, into the compressed input data, dictionary bits indicating which nibble values are compressed and which nibble values are un-compressed in the compressed input data.

In Example 29, the subject matter of Example 28 further includes, wherein the dictionary bits include only two bits or only three bits, wherein a first value of the dictionary bits indicates that no dictionary is provided in the compressed input data, a second value of the dictionary bits indicates that a dictionary of a single un-compressed nibble value is provided in the compressed input data, and a third value of the dictionary bits indicates that a full dictionary of four nibble values is provided in the compressed input data.

In Example 30, the subject matter of Example 29 further includes, wherein the dictionary bits further include a third value indicating that a frequent value appears un-compressed in the compressed input data.

In Example 31, the subject matter of Example 30 further includes, wherein the operations further comprise parsing the input data into nibbles and determine, of sixteen possible nibble values, which four nibble values occur most frequently in the parsed input data, encoding the four most frequent nibble values using two bits each, and replacing each of the most frequent nibble values in the input data with the corresponding encoding.

In Example 32, the subject matter of Example 31 further includes, wherein the operations further comprise inserting in front of each nibble in the input data that is not equal to one of the nibble values that occur most frequently, a single bit indicating that the nibble value is a regular value.

In Example 33, the subject matter of Example 32 further includes, wherein the operations further include inserting, in front of each of the four nibble values that occur most frequently and directly follows a regular value, two bits indicating whether consecutive frequent values or a single frequent value immediately follows.

Example 34 is a method of data nibble-histogram compression, the method comprising parsing, by processing circuitry, input data into nibbles, the nibbles including four consecutive bits, determining, of sixteen possible nibble values, which four nibble values occur most frequently in the parsed input data, encoding the four most frequent nibble values using two bits each, and replacing each of the most frequent nibble values in the input data with the corresponding encoding.

In Example 35, the subject matter of Example 34 further includes inserting, in front of each nibble in the input data that is not equal to one of the nibble values that occur most frequently, a single bit indicating that the nibble value is a regular value.

In Example 36, the subject matter of Example 35 further includes inserting, in front of each of the four nibble values that occur most frequently and directly follows a regular value, two bits indicating whether consecutive frequent values or a single frequent value follows.

In Example 37, the subject matter of Example 34 further includes inserting into the compressed input data dictionary bits indicating which nibble values are compressed and which nibble values are un-compressed in the compressed input data.

In Example 38, the subject matter of Example 37 further includes, wherein the dictionary bits include only two bits or only three bits, wherein a first value of the dictionary bits indicates that no dictionary is provided in the compressed input data, a second value of the dictionary bits indicates that a dictionary of a single un-compressed nibble value is provided in the compressed input data, and a third value of the dictionary bits indicates that a full dictionary of four nibble values is provided in the compressed input data.

In Example 39, the subject matter of Example 38 further includes, wherein the dictionary bits further include a third value indicating that a frequent value appears un-compressed in the compressed input data.

Example 40 is a machine-readable medium including instructions that, when executed by a machine, configure the machine to perform operations comprising parsing, by processing circuitry, input data into nibbles, the nibbles including four consecutive bits; determining, of sixteen possible nibble values, which four nibble values occur most frequently in the parsed input data, encoding the four most frequent nibble values using two bits each, and replacing each of the most frequent nibble values in the input data with the corresponding encoding.

In Example 41, the subject matter of Example 38 further includes, wherein the operations further comprise inserting, in front of each nibble in the input data that is not equal to one of the nibble values that occur most frequently, a single bit indicating that the nibble value is a regular value.

In Example 42, the subject matter of Example 41 further includes, wherein the operations further comprise inserting, in front of each of the four nibble values that occur most frequently and directly follows a regular value, two bits indicating whether consecutive frequent values or a single frequent value follows.

In Example 43, the subject matter of at least one of Examples 40-42 further includes, wherein the operations further comprise inserting into the compressed input data dictionary bits indicating which nibble values are compressed and which nibble values are un-compressed in the compressed input data.

In Example 44, the subject matter of at least one of Examples 40-43 further includes, wherein the dictionary bits include only two bits or only three bits, wherein a first value of the dictionary bits indicates that no dictionary is provided in the compressed input data, a second value of the dictionary bits indicates that a dictionary of a single un-compressed nibble value is provided in the compressed input data, and a third value of the dictionary bits indicates that a full dictionary of four nibble values is provided in the compressed input data.

In Example 45, the subject matter of at least one of Examples 40-43 further includes, wherein the dictionary bits further include a third value indicating that a frequent value appears un-compressed in the compressed input data.

Example 46 is at least one machine-readable medium including instructions, which when executed by a machine, cause the machine to perform operations of any of the operations of Examples 1-45.

Example 47 is an apparatus comprising means for performing any of the operations of Examples 1-45.

Example 48 is a system to perform the operations of any of Examples 1-45.

Example 49 is a method to perform the operations of any of Examples 1-45.

Additional Notes:

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device comprising:
    an input port to receive input data to be compressed;
    processing circuitry coupled to receive the input data from the input port, the processing circuitry configured to:
    determine a first amount of space freed by compressing the input data using a special value compression technique including a determination of the first amount of space freed includes the processing circuitry to determine whether the input data includes greater than a threshold number of bytes that represent 0x00 or 0xFF;
    determine a second amount of space freed by compressing the input data using a second, different compression technique;
    compress the input data using the compression technique of the special value and second compression techniques determined to free up more space to create compressed input data; and
    insert into the compressed input data, security data including one of a message authentication code (MAC) and an inventory control tag (ICT).

2. The device of claim 1, wherein the second compression technique includes one of adjacent byte-equality compression, special-value compression, word-equality compression, double-word histogram compression, and nibble histogram compression.

3. The device of claim 1, wherein the determination of the first amount of space freed further includes the processing circuitry to determine a number of bytes that are equal to one or more of the 0x00 and 0xFF.

4. The device of claim 2, wherein the second compression technique includes nibble-histogram compression.

5. The device of claim 4, wherein the processing circuitry is further configured to insert, into the compressed input data, dictionary bits indicating which nibble values are compressed and which nibble values are un-compressed in the compressed input data.

6. The device of claim 5, wherein the dictionary bits further include a third value indicating that a frequent value appears un-compressed in the compressed input data.

7. The device of claim 6, wherein the processing circuitry is further configured to:
    parse the input data into nibbles and determine, of sixteen possible nibble values, which four nibble values occur most frequently in the parsed input data;
    encode the four most frequent nibble values using two bits each; and
    replace occurrences of the most frequent nibble values in the input data with the corresponding encoding.

8. The device of claim 7, wherein the processing circuitry is further to configured insert in front of each nibble in the input data that is not equal to one of the nibble values that occur most frequently, a single bit indicating that the nibble value is a regular value.

9. A method of special value compression, the method comprising:
    determining a first amount of space freed by compressing an input data using a special value compression technique including a determination of the first amount of space freed determining whether the input data includes greater than a threshold number of bytes that represent 0x00 or 0xFF;
    determining a second amount of space freed by compressing the input data using a second, different compression technique;
    compressing the input data using the compression technique of the special value and second compression techniques determined to free up more space to create compressed input data; and
    inserting into the compressed input data, security data including one of a message authentication code (MAC) and an inventory control tag (ICT).

10. The method of claim 9, wherein the second compression technique includes one of adjacent byte-equality compression, special-value compression, word-equality compression, double-word histogram compression, and nibble histogram compression.

11. The method of claim 9, wherein determining the first amount of space freed further includes determining a number of bytes that are equal to one or more of the 0x00 and 0xFF.

12. The method of claim 10, wherein the second compression technique includes nibble-histogram compression.

13. The method of claim 12, further comprising inserting, into the compressed input data, dictionary bits indicating which nibble values are compressed and which nibble values are un-compressed in the compressed input data.

14. The method of claim 13, wherein the dictionary bits further include a third value indicating that a frequent value appears un-compressed in the compressed input data.

15. The method of claim 14, further comprising:
parsing the input data into nibbles and determine, of sixteen possible nibble values, which four nibble values occur most frequently in the parsed input data;
encoding the four most frequent nibble values using two bits each; and
replacing occurrences of the most frequent nibble values in the input data with the corresponding encoding.

16. The method of claim 15, further comprising inserting in front of each nibble in the input data that is not equal to one of the nibble values that occur most frequently, a single bit indicating that the nibble value is a regular value.

17. At least one non-transitory machine-readable medium including instructions that, when executed by a machine, configure the machine to perform operations comprising:
determining a first amount of space freed by compressing an input data using a special value compression technique including a determination of the first amount of space freed includes the processing circuitry to determine whether the input data includes greater than a threshold number of bytes that represent 0x00 or 0xFF;
determining a second amount of space freed by compressing the input data using a second, different compression technique;
compressing the input data using the compression technique of the special value and second compression techniques determined to free up more space to create compressed input data; and
inserting into the compressed input data, security data including one of a message authentication code (MAC) and an inventory control tag (ICT).

18. The at least one non-transitory machine-readable medium of claim 17, wherein the second compression technique includes one of adjacent byte-equality compression, special-value compression, word-equality compression, double-word histogram compression, and nibble histogram compression.

19. The at least one non-transitory machine-readable medium of claim 17, wherein determining the first amount of space freed further includes the processing circuitry to determine a number of bytes that are equal to one or more of the 0x00 and 0xFF.

20. The at least one non-transitory machine-readable medium of claim 18, wherein the second compression technique includes nibble-histogram compression.

* * * * *